US012587425B2

(12) United States Patent
Bhamri et al.

(10) Patent No.: US 12,587,425 B2
(45) Date of Patent: Mar. 24, 2026

(54) MULTIPLE DISCRETE FOURIER TRANSFORMS FOR TRANSMISSION AND RECEPTION

(71) Applicant: Lenovo (Singapore) Pte. Ltd., New Tech Park (SG)

(72) Inventors: Ankit Bhamri, Rödermark (DE); Ali Ramadan Ali, Kraiburg am Inn (DE); Sher Ali Cheema, Ilmenau (DE); Vijay Nangia, Woodridge, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 312 days.

(21) Appl. No.: 18/260,219

(22) PCT Filed: Dec. 30, 2021

(86) PCT No.: PCT/IB2021/062500
§ 371 (c)(1),
(2) Date: Jun. 30, 2023

(87) PCT Pub. No.: WO2022/144840
PCT Pub. Date: Jul. 7, 2022

(65) Prior Publication Data
US 2024/0297815 A1     Sep. 5, 2024

Related U.S. Application Data

(60) Provisional application No. 63/132,458, filed on Dec. 30, 2020.

(51) Int. Cl.
*H04L 27/26* (2006.01)
(52) U.S. Cl.
CPC .... *H04L 27/2636* (2013.01); *H04L 27/26134* (2021.01)

(58) Field of Classification Search
CPC ...................... H04L 27/2636; H04L 27/26134
See application file for complete search history.

(56) References Cited

U.S. PATENT DOCUMENTS

2014/0376465 A1* 12/2014 Choi ................. H04L 27/26526
                                                        370/329
2018/0145803 A1   5/2018 Park et al.
(Continued)

FOREIGN PATENT DOCUMENTS

WO   WO-2017173131 A1 * 10/2017   ......... H04L 27/2636
WO        2020249844 A1   12/2020

OTHER PUBLICATIONS

PCT/IB2021/062500, "Notification of Transmittal of the International Search Report and the Written Opinion of the International Searching Authority, or the Declaration", International Searching Authority, Mar. 25, 2022, pp. 1-13.
(Continued)

*Primary Examiner* — Duc C Ho
(74) *Attorney, Agent, or Firm* — Kunzler Needham & Hilton

(57) ABSTRACT

Apparatuses, methods, and systems are disclosed for multiple discrete Fourier transforms for transmission and reception. An apparatus includes a transceiver that receives a first configuration from a network to apply multiple discrete Fourier transform ("DFT")-based waveforms at one or more of a transmitter and a receiver, receives a second configuration from the network for a physical channel, the second configuration comprising DFT configuration information, and receives a third configuration from the network for determining, based on the second configuration, an inverse-DFT ("IDFT") configuration. An apparatus includes a processor that performs multiple DFT-based transmissions on a time-domain symbol transmitted to the network based on the first and second configurations and performs multiple IDFT-
(Continued)

based receptions of a time-domain symbol received from the network, based on the IDFT configuration.

20 Claims, 13 Drawing Sheets

(56)                    References Cited

U.S. PATENT DOCUMENTS

2018/0145854 A1*   5/2018  Akkarakaran  ...... H04L 27/2636
2018/0288749 A1    10/2018  Sun et al.
2019/0182091 A1    6/2019  Bai et al.

OTHER PUBLICATIONS

3GPP, "3rd Generation Partnership Project; Technical Specification Group Radio Access Network; NR; Physical channels and modulation (Release 16)", 3GPP TS 38.211 V16.3.0, Sep. 2020, pp. 1-133.
3GPP, "3rd Generation Partnership Project; Technical Specification Group Radio Access Network; NR; Physical layer procedures for control (Release 16)", 3GPP TS 38.213 V16.3.0, Sep. 2020, pp. 1-179.

* cited by examiner

```
-- ASN1START
-- TAG-CONTROLRESOURCESET-START

ControlResourceSet ::=                    SEQUENCE {
    controlResourceSetId                      ControlResourceSetId,
402 ⌐numberOfDFTs                            INTEGER (1..maxNumOfDFTs)                    OPTIONAL,
404 ⌐sizeOfDFT                               INTEGER (1..maxSizeOfDFT)                    OPTIONAL,
406 ⌐frequencyDomainResources                BIT STRING (SIZE (45)),
    duration                              INTEGER (1..maxCoReSetDuration),
    cce-REG-MappingType                       CHOICE {
        interleaved                               SEQUENCE {
            reg-BundleSize                            ENUMERATED {n2, n3, n6},
            interleaverSize                           ENUMERATED {n2, n3, n6},
            shiftIndex                                INTEGER(0..maxNrofPhysicalResourceBlocks-1)   OPTIONAL -- Need S
        },
        nonInterleaved                            NULL
    },
    precoderGranularity                       ENUMERATED {sameAsREG-bundle, allContiguousRBs},
    tci-StatesPDCCH-ToAddList                 SEQUENCE(SIZE (1..maxNrofTCI-StatesPDCCH)) OF TCI-StateId OPTIONAL, -- Cond
NotSIB1-initialBWP
    tci-StatesPDCCH-ToReleaseList             SEQUENCE (SIZE (1..maxNrofTCI-StatesPDCCH)) OF TCI-StateId OPTIONAL, -- Cond
NotSIB1-initialBWP
    tci-PresentInDCI                          ENUMERATED {enabled}                         OPTIONAL, -- Need S
    pdcch-DMRS-ScramblingID                   INTEGER (0..65535)                           OPTIONAL, -- Need S
    ...,
    [[
    rb-Offset-r16                         INTEGER (0..5)                                   OPTIONAL, -- Need S
    tci-PresentForDCI-Format1-2-r16       INTEGER (1..3)                                   OPTIONAL, -- Need S
    coresetPoolIndex-r16                  INTEGER (0..1)                                   OPTIONAL, -- Need S
    controlResourceSetId-v1610            ControlResourceSetId-v1610                       OPTIONAL  -- Need S
    ]]
}

-- TAG-CONTROLRESOURCESET-STOP
-- ASN1STOP
```

FIG. 4

```
-- ASN1START
-- TAG-CONTROLRESOURCESET-START

ControlResourceSet ::=                    SEQUENCE {
    controlResourceSetId                      ControlResourceSetId,
    numberOfDFTsDMRS                              INTEGER (1..maxNumOfDFTs)          OPTIONAL,
    sizeOfDFTDMRS                                 INTEGER (1..maxSizeOfDFT)          OPTIONAL,
    frequencyDomainResourcesDMRS      BIT STRING (SIZE (45))        OPTIONAL,
    numberOfDFTsControl                           INTEGER (1..maxNumOfDFTs)          OPTIONAL,
    sizeOfDFTControl                              INTEGER (1..maxSizeOfDFT)          OPTIONAL,
    frequencyDomainResourcesControl   BIT STRING (SIZE (45))        OPTIONAL,
    duration                INTEGER (1..maxCoReSetDuration),
    cce-REG-MappingType            CHOICE {
        interleaved                SEQUENCE {
            reg-BundleSize                 ENUMERATED {n2, n3, n6},
            interleaverSize                ENUMERATED {n2, n3, n6},
            shiftIndex               INTEGER(0..maxNrofPhysicalResourceBlocks-1)      OPTIONAL -- Need S
        },
        nonInterleaved           NULL
    },
    precoderGranularity           ENUMERATED {sameAsREG-bundle, allContiguousRBs},
    tci-StatesPDCCH-ToAddList     SEQUENCE(SIZE (1..maxNrofTCI-StatesPDCCH)) OF TCI-StateId OPTIONAL, -- Cond NotSIB1-initialBWP
    tci-StatesPDCCH-ToReleaseList SEQUENCE(SIZE (1..maxNrofTCI-StatesPDCCH)) OF TCI-StateId OPTIONAL, -- Cond NotSIB1-initialBWP
    tci-PresentInDCI              ENUMERATED {enabled}                           OPTIONAL, -- Need S
    pdcch-DMRS-ScramblingID           INTEGER (0..65535)                         OPTIONAL, -- Need S
    ....
    [[
    rb-Offset-r16            INTEGER (0..5)                 OPTIONAL, -- Need S
    tci-PresentForDCI-Format1-2-r16   INTEGER (1..3)            OPTIONAL, -- Need S
    coresetPoolIndex-r16          INTEGER (0..1)               OPTIONAL, -- Need S
    controlResourceSetId-v1610        ControlResourceSetId-v1610         OPTIONAL -- Need S
    ]]
}

-- TAG-CONTROLRESOURCESET-STOP
-- ASN1STOP
```

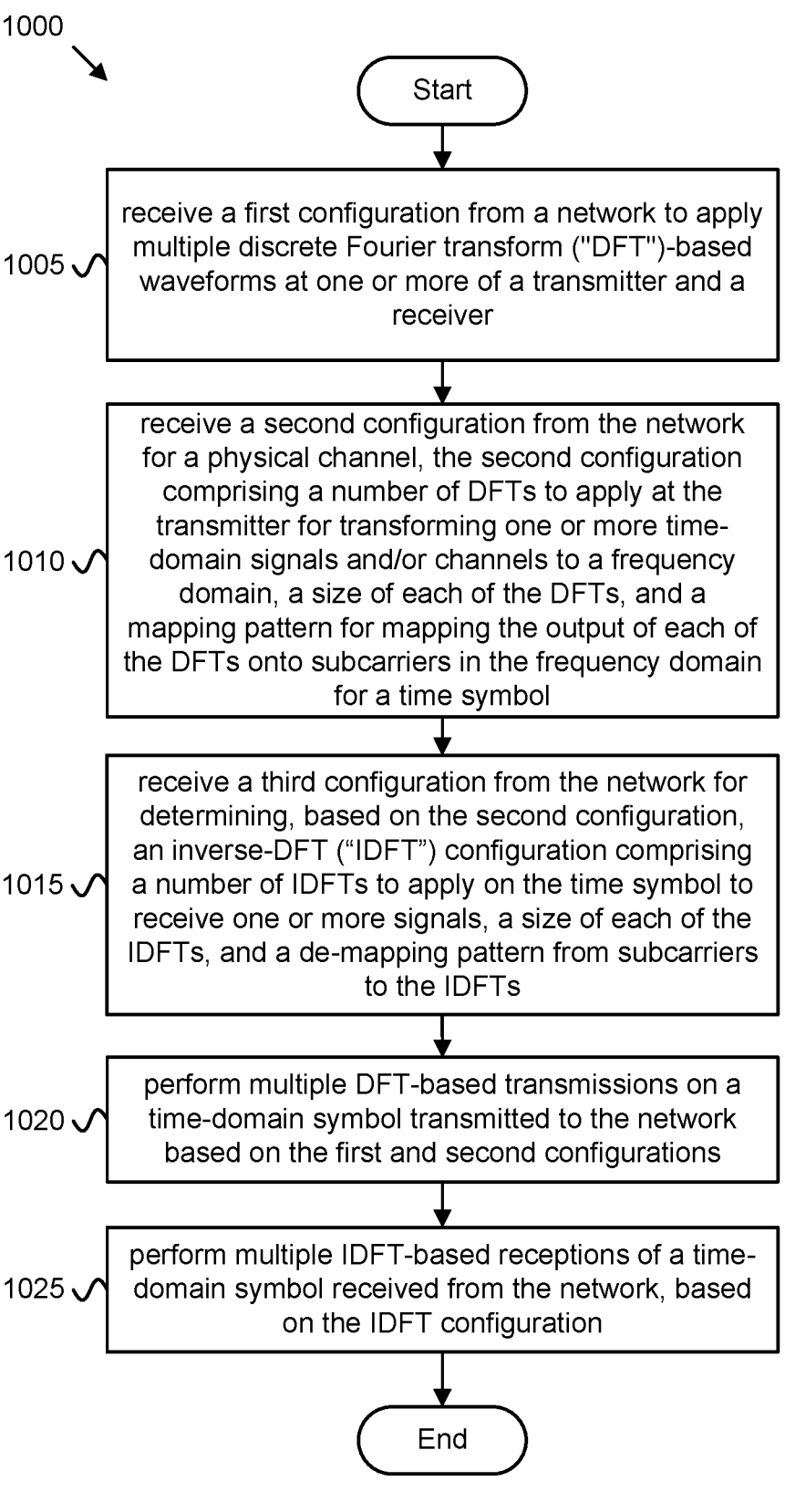

1000

Start 1005   receive a first configuration from a network to apply multiple discrete Fourier transform ("DFT")-based waveforms at one or more of a transmitter and a receiver 1010   receive a second configuration from the network for a physical channel, the second configuration comprising a number of DFTs to apply at the transmitter for transforming one or more time-domain signals and/or channels to a frequency domain, a size of each of the DFTs, and a mapping pattern for mapping the output of each of the DFTs onto subcarriers in the frequency domain for a time symbol 1015   receive a third configuration from the network for determining, based on the second configuration, an inverse-DFT ("IDFT") configuration comprising a number of IDFTs to apply on the time symbol to receive one or more signals, a size of each of the IDFTs, and a de-mapping pattern from subcarriers to the IDFTs 1020   perform multiple DFT-based transmissions on a time-domain symbol transmitted to the network based on the first and second configurations 1025   perform multiple IDFT-based receptions of a time-domain symbol received from the network, based on the IDFT configuration End

FIG. 10

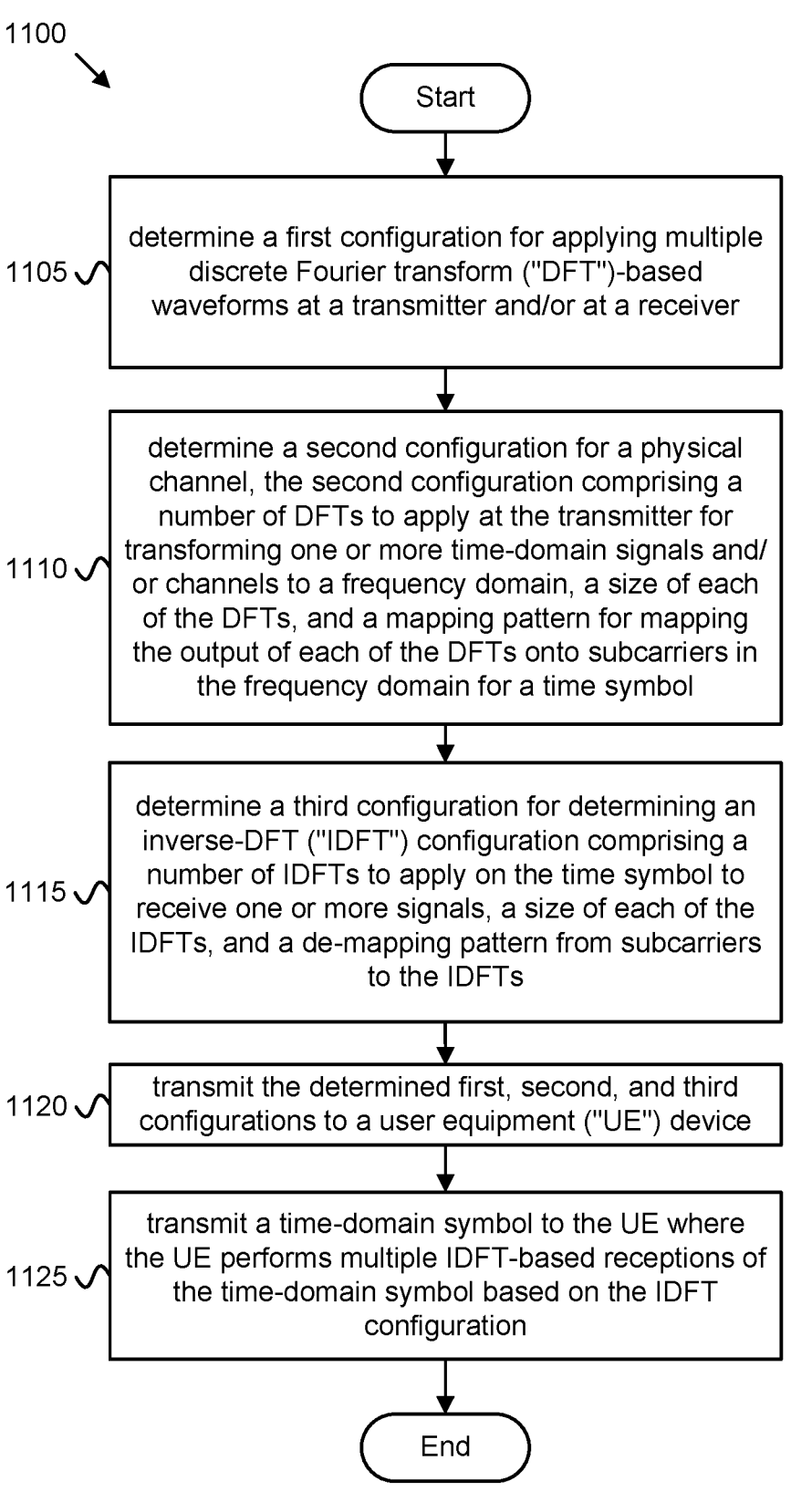

1100

Start 1105 determine a first configuration for applying multiple discrete Fourier transform ("DFT")-based waveforms at a transmitter and/or at a receiver 1110 determine a second configuration for a physical channel, the second configuration comprising a number of DFTs to apply at the transmitter for transforming one or more time-domain signals and/or channels to a frequency domain, a size of each of the DFTs, and a mapping pattern for mapping the output of each of the DFTs onto subcarriers in the frequency domain for a time symbol 1115 determine a third configuration for determining an inverse-DFT ("IDFT") configuration comprising a number of IDFTs to apply on the time symbol to receive one or more signals, a size of each of the IDFTs, and a de-mapping pattern from subcarriers to the IDFTs 1120 transmit the determined first, second, and third configurations to a user equipment ("UE") device 1125 transmit a time-domain symbol to the UE where the UE performs multiple IDFT-based receptions of the time-domain symbol based on the IDFT configuration End

FIG. 11

MULTIPLE DISCRETE FOURIER TRANSFORMS FOR TRANSMISSION AND RECEPTION

CROSS-REFERENCES TO RELATED APPLICATIONS

This application claims priority to U.S. Provisional Patent Application No. 63/132,458 entitled "MULTI DFT-S-OFDM WAVEFORM FOR DOWNLINK" and filed on Dec. 30, 2020, for Ankit Bhamri et al., which is incorporated herein by reference in its entirety.

FIELD

The subject matter disclosed herein relates generally to wireless communications and more particularly relates to multiple discrete Fourier transforms for transmission and reception.

BACKGROUND

In new radio ("NR") Rel-15, multi-carrier based waveform, e.g., cyclic prefix orthogonal frequency division multiplexing ("CP-OFDM") has been adopted for downlink ("DL") as well as for uplink ("UL") and additionally single-carrier based waveform, e.g., discrete Fourier transform spread OFDM ("DFT-s-OFDM"), or CP single carrier frequency division multiplexing ("CP-SC-FDM") has also been adopted for UL. However, CP-OFDM performance degrades at high frequencies (e.g., beyond 52.6 GHz) due to its sensitivity to phase noise and its high peak-to-average power ratio ("PAPR") or cubic metric ("CM") that limits the cell coverage, edge of cell performance, and higher UE power consumption.

BRIEF SUMMARY

Disclosed are procedures for multiple discrete Fourier transforms for transmission and reception. Said procedures may be implemented by apparatus, systems, methods, and/or computer program products.

In one embodiment, a first apparatus includes a transceiver that receives a first configuration from a network to apply multiple discrete Fourier transform ("DFT")-based waveforms at one or more of a transmitter and a receiver. In one embodiment, the transceiver receives a second configuration from the network for a physical channel, the second configuration comprising a number of DFTs to apply at the transmitter for transforming one or more time-domain signals and/or channels to a frequency domain, a size of each of the DFTs, and a mapping pattern for mapping the output of each of the DFTs onto subcarriers in the frequency domain for a time symbol. In one embodiment, the transceiver receives a third configuration from the network for determining, based on the second configuration, an inverse-DFT ("IDFT") configuration comprising a number of IDFTs to apply on the time symbol to receive one or more signals, a size of each of the IDFTs, and a de-mapping pattern from subcarriers to the IDFTs. In one embodiment, the first apparatus includes a processor that performs multiple DFT-based transmissions on a time-domain symbol transmitted to the network based on the first and second configurations and performs multiple IDFT-based receptions of a time-domain symbol received from the network, based on the IDFT configuration.

In one embodiment, a first method includes receiving a first configuration from a network to apply multiple discrete Fourier transform ("DFT")-based waveforms at one or more of a transmitter and a receiver. In one embodiment, the first method includes receiving a second configuration from the network for a physical channel, the second configuration comprising a number of DFTs to apply at the transmitter for transforming one or more time-domain signals and/or channels to a frequency domain, a size of each of the DFTs, and a mapping pattern for mapping the output of each of the DFTs onto subcarriers in the frequency domain for a time symbol. In one embodiment, the first method includes receiving a third configuration from the network for determining, based on the second configuration, an inverse-DFT ("IDFT") configuration comprising a number of IDFTs to apply on the time symbol to receive one or more signals, a size of each of the IDFTs, and a de-mapping pattern from subcarriers to the IDFTs. In one embodiment, the first method includes performing multiple DFT-based transmissions on a time-domain symbol transmitted to the network based on the first and second configurations and performing multiple IDFT-based receptions of a time-domain symbol received from the network, based on the IDFT configuration.

In one embodiment, a second apparatus includes a processor that determines a first configuration for applying multiple discrete Fourier transform ("DFT")-based waveforms at a transmitter and/or at a receiver. In one embodiment, the processor determines a second configuration for a physical channel, the second configuration comprising a number of DFTs to apply at the transmitter for transforming one or more time-domain signals and/or channels to a frequency domain, a size of each of the DFTs, and a mapping pattern for mapping the output of each of the DFTs onto subcarriers in the frequency domain for a time symbol. In one embodiment, the processor determines a third configuration for determining an inverse-DFT ("IDFT") configuration comprising a number of IDFTs to apply on the time symbol to receive one or more signals, a size of each of the IDFTs, and a de-mapping pattern from subcarriers to the IDFTs. In one embodiment, the second apparatus includes a transceiver that transmits the determined first, second, and third configurations to a user equipment ("UE") device and transmits a time-domain symbol to the UE where the UE performs multiple IDFT-based receptions of the time-domain symbol based on the IDFT configuration.

In one embodiment, a second method includes determining a first configuration for applying multiple discrete Fourier transform ("DFT")-based waveforms at a transmitter and/or at a receiver. In one embodiment, the second method includes determining a second configuration for a physical channel, the second configuration comprising a number of DFTs to apply at the transmitter for transforming one or more time-domain signals and/or channels to a frequency domain, a size of each of the DFTs, and a mapping pattern for mapping the output of each of the DFTs onto subcarriers in the frequency domain for a time symbol. In one embodiment, the second method includes determining a third configuration for determining an inverse-DFT ("IDFT") configuration comprising a number of IDFTs to apply on the time symbol to receive one or more signals, a size of each of the IDFTs, and a de-mapping pattern from subcarriers to the IDFTs. In one embodiment, the second method includes transmitting the determined first, second, and third configurations to a user equipment ("UE") device and transmitting a time-domain symbol to the UE where the UE performs multiple IDFT-based receptions of the time-domain symbol based on the IDFT configuration.

3

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 4 depicts new fields in the ControlResourceSet information element for multi-DFT-s-OFDM;

FIG. 6 depicts new fields in the ControlResourceSet information element for multi-DFT-s-OFDM for DM-RS and control data:

FIG. 10 is a block diagram illustrating one embodiment of a method for multiple discrete Fourier transforms for transmission and reception; and FIG. 11 is a block diagram illustrating one embodiment of another method for multiple discrete Fourier transforms for transmission and reception.

DETAILED DESCRIPTION

Figure 1:
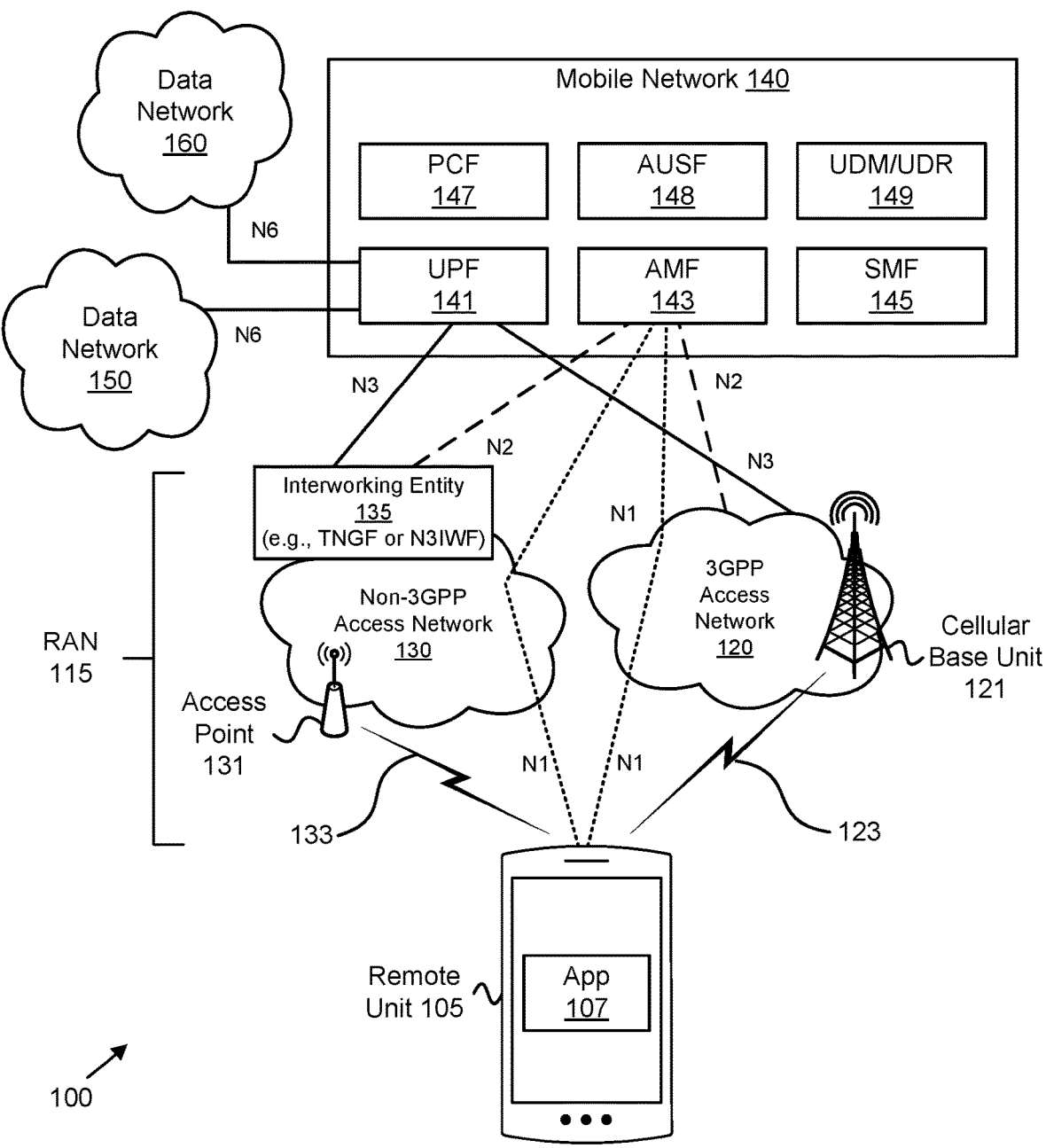
FIG. 1 is a schematic block diagram illustrating one embodiment of a wireless communication system for multiple discrete Fourier transforms for transmission and reception.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage 15 medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for multiple discrete Fourier transforms for transmission and reception. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

In new radio ("NR") Rel-15, multi-carrier based waveform, e.g., cyclic prefix orthogonal frequency division multiplexing ("CP-OFDM") has been adopted for downlink ("DL") as well as for uplink ("UL") and additionally single-carrier based waveform, e.g., discrete Fourier transform spread OFDM ("DFT-s-OFDM"), or CP single carrier frequency division multiplexing ("CP-SC-FDM") is also adopted for UL. However, CP-OFDM performance degrades at high frequencies (e.g., beyond 52.6 GHz) due to its sensitivity to phase noise and its high peak-to-average power ratio ("PAPR") or cubic metric ("CM") that limits the cell coverage, edge of cell performance and higher UE power consumption.

The problems of CP-OFDM at high frequencies become severe as the modulation order and/or the channel bandwidth increases. The above-mentioned problems make a single carrier waveform such as DFT-s-OFDM a suitable candidate at high frequencies due to its natural robustness against phase noise and its low PAPR or CM. Currently, standardization efforts are on-going in Rel-17 to support NR operation from 52.6 GHz to 71 GHz. In the initial discussions, before the start of NR Rel-17, it was proposed to use single carrier waveforms such as DFT-s-OFDM waveforms for DL due to its low PAPR compared with CP-OFDM. But it was decided to use CP-OFDM only for DL for 52.6 GHz to 71 GHz and consider mainly higher subcarrier spacing.

However, in future releases of 3GPP NR, it is quite possible that the discussion related to single carrier waveform starts again, especially for potential standardization work for beyond 71 GHz. Since NR already supports DFT-s-OFDM for UL, it is likely that it will be considered as one of the candidate single carrier waveforms for DL as well for NR B71 GHz. DFT-s-OFDM comes with restrictions in terms of multiplexing in frequency domain on a given time symbol and, therefore, if DFT-s-OFDM is going to be applied for DL, one of the main challenges would be how to apply it with physical downlink control channel ("PDCCH").

In this disclosure, the signaling aspect to facilitate PDCCH transmission/reception with multiple DFTs for DFT-s-OFDM is discussed by considering the following key issues:

Multiple control resource set ("CORESET") multiplexing in time and/or frequency for a PDCCH with DFT-s-OFDM;

Demodulation reference signal ("DM-RS") multiplexing with CORESET in time and/or frequency with DFT-s-OFDM; and Multiplexing PDCCH and other channels such as physical downlink shared channel ("PDSCH") or synchronization signal block ("SSB") on a symbol with DFT-s-OFDM.

FIG. 1 depicts a wireless communication system 100 for multiple discrete Fourier transforms for transmission and reception, according to embodiments of the disclosure. In one embodiment, the wireless communication system 100 includes at least one remote unit 105, a Fifth-Generation Radio Access Network ("5G-RAN") 115, and a mobile core network 140. The 5G-RAN 115 and the mobile core network 140 form a mobile communication network. The 5G-RAN 115 may be composed of a Third Generation Partnership Project ("3GPP") access network 120 containing at least one cellular base unit 121 and/or a non-3GPP access network 130 containing at least one access point 131. The remote unit 105 communicates with the 3GPP access network 120 using 3GPP communication links 123 and/or communicates with the non-3GPP access network 130 using non-3GPP communication links 133. Even though a specific number of remote units 105, 3GPP access networks 120, cellular base units 121, 3GPP communication links 123, non-3GPP access networks 130, access points 131, non-3GPP communication links 133, and mobile core networks 140 are depicted in FIG. 1, one of skill in the art will recognize that any number of remote units 105, 3GPP access networks 120, cellular base units 121, 3GPP communication links 123, non-3GPP access networks 130, access points 131, non-3GPP communication links 133, and mobile core networks 140 may be included in the wireless communication system 100.

In one implementation, the RAN 120 is compliant with the 5G system specified in the 3GPP specifications. For example, the RAN 120 may be a NextGen RAN ("NG-RAN"), implementing NR Radio Access Technology ("RAT") and/or Long Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the User Equipments ("UEs"), subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the cellular base units 121 in the 3GPP access network 120 via UL and DL communication signals. Furthermore, the UL and DL communication signals may be carried over the 3GPP communication links 123. Similarly, the remote units 105 may communicate with one or more access points 131 in the non-3GPP access network(s) 130 via UL and DL communication signals carried over the non-3GPP communication links 133. Here, the access networks 120 and 130 are intermediate networks that provide the remote units 105 with access to the mobile core network 140.

In some embodiments, the remote units 105 communicate with a remote host (e.g., in the data network 150 or in the data network 160) via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the 5G-RAN 115 (e.g., via the 3GPP access network 120 and/or non-3GPP network 130). The mobile core network 140 then relays traffic between the remote unit 105 and the remote host using the PDU session. The PDU session represents a logical connection between the remote unit 105 and a User Plane Function ("UPF") 141.

In order to establish the PDU session (or Packet Data Network ("PDN") connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. Additionally—or alternatively—the remote unit 105 may have at least one PDU session for communicating with the packet data network 160. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 131. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a PDN connection (also referred to as EPS session) provides E2E UP connectivity between the remote unit and a PDN. The PDN connectivity procedure establishes an EPS Bearer, e.g., a tunnel between the remote unit 105 and a Packet Gateway ("P-GW"), not shown, in the mobile core network 130. In certain embodiments, there is a one-to-one mapping between an EPS Bearer and a QoS profile, such that all packets belonging to a specific EPS Bearer have the same QoS Class Identifier ("QCI").

As described in greater detail below, the remote unit 105 may use a first data connection (e.g., PDU Session) established with the first mobile core network 130 to establish a second data connection (e.g., part of a second PDU session) with the second mobile core network 140. When establishing a data connection (e.g., PDU session) with the second mobile core network 140, the remote unit 105 uses the first data connection to register with the second mobile core network 140.

The cellular base units 121 may be distributed over a geographic region. In certain embodiments, a cellular base unit 121 may also be referred to as an access terminal, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a Home Node-B, a relay node, a device, or by any other terminology used in the art. The cellular base units 121 are generally part of a radio access network ("RAN"), such as the 3GPP access network 120, that may include one or more controllers communicably coupled to one or more corresponding cellular base units 121. These and other elements of radio access network are not illustrated but are well known generally by those having ordinary skill in the art. The cellular base units 121 connect to the mobile core network 140 via the 3GPP access network 120.

The cellular base units 121 may serve a number of remote units 105 within a serving area, for example, a cell or a cell sector, via a 3GPP wireless communication link 123. The cellular base units 121 may communicate directly with one or more of the remote units 105 via communication signals. Generally, the cellular base units 121 transmit DL communication signals to serve the remote units 105 in the time, frequency, and/or spatial domain. Furthermore, the DL communication signals may be carried over the 3GPP communication links 123. The 3GPP communication links 123 may be any suitable carrier in licensed or unlicensed radio spectrum. The 3GPP communication links 123 facilitate communication between one or more of the remote units 105 and/or one or more of the cellular base units 121. Note that during NR operation on unlicensed spectrum (referred to as "NR-U"), the base unit 121 and the remote unit 105 communicate over unlicensed (e.g., shared) radio spectrum.

The non-3GPP access networks 130 may be distributed over a geographic region. Each non-3GPP access network 130 may serve a number of remote units 105 with a serving area. An access point 131 in a non-3GPP access network 130 may communicate directly with one or more remote units 105 by receiving UL communication signals and transmitting DL communication signals to serve the remote units 105 in the time, frequency, and/or spatial domain. Both DL and UL communication signals are carried over the non-3GPP communication links 133. The 3GPP communication links 123 and non-3GPP communication links 133 may employ different frequencies and/or different communication protocols. In various embodiments, an access point 131 may communicate using unlicensed radio spectrum. The mobile core network 140 may provide services to a remote unit 105 via the non-3GPP access networks 130, as described in greater detail herein.

In some embodiments, a non-3GPP access network 130 connects to the mobile core network 140 via an interworking entity 135. The interworking entity 135 provides an interworking between the non-3GPP access network 130 and the mobile core network 140. The interworking entity 135 supports connectivity via the "N2" and "N3" interfaces. As depicted, both the 3GPP access network 120 and the interworking entity 135 communicate with the Access and Mobility Management Function ("AMF") 143 using a "N2" interface. The 3GPP access network 120 and interworking entity 135 also communicate with the UPF 141 using a "N3" interface. While depicted as outside the mobile core network 140, in other embodiments the interworking entity 135 may be a part of the core network. While depicted as outside the non-3GPP RAN 130, in other embodiments the interworking entity 135 may be a part of the non-3GPP RAN 130.

In certain embodiments, a non-3GPP access network 130 may be controlled by an operator of the mobile core network 140 and may have direct access to the mobile core network 140. Such a non-3GPP AN deployment is referred to as a "trusted non-3GPP access network." A non-3GPP access network 130 is considered as "trusted" when it is operated by the 3GPP operator, or a trusted partner, and supports certain security features, such as strong air-interface encryption. In contrast, a non-3GPP AN deployment that is not controlled by an operator (or trusted partner) of the mobile core network 140, does not have direct access to the mobile core network 140, or does not support the certain security features is referred to as a "non-trusted" non-3GPP access network. An interworking entity 135 deployed in a trusted non-3GPP access network 130 may be referred to herein as a Trusted Network Gateway Function ("TNGF"). An interworking entity 135 deployed in a non-trusted non-3GPP access network 130 may be referred to herein as a non-3GPP interworking function ("N3IWF"). While depicted as a part of the non-3GPP access network 130, in some embodiments the N3IWF may be a part of the mobile core network 140 or may be located in the data network 150.

In one embodiment, the mobile core network 140 is a 5G core ("5GC") or the evolved packet core ("EPC"), which may be coupled to a data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane functions including, but not limited to, an AMF 143 that serves the 5G-RAN 115, a Session Management Function ("SMF") 145, a Policy Control Function ("PCF") 147, an Authentication Server Function ("AUSF") 148, a Unified Data Management ("UDM") and Unified Data Repository function ("UDR").

The UPF(s) 141 is responsible for packet routing and forwarding, packet inspection, QoS handling, and external PDU session for interconnecting Data Network ("DN"), in the 5G architecture. The AMF 143 is responsible for termination of Non-Access Stratum ("NAS") signaling, NAS ciphering & integrity protection, registration management, connection management, mobility management, access authentication and authorization, security context management. The SMF 145 is responsible for session management (e.g., session establishment, modification, release), remote unit (e.g., UE) IP address allocation & management, DL data notification, and traffic steering configuration for UPF for proper traffic routing.

The PCF 147 is responsible for unified policy framework, providing policy rules to Control Plane ("CP") functions, access subscription information for policy decisions in UDR. The AUSF 148 acts as an authentication server.

The UDM is responsible for generation of Authentication and Key Agreement ("AKA") credentials, user identification handling, access authorization, subscription management. The UDR is a repository of subscriber information and can be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In various embodiments, the mobile core network 140 may also include an Network Exposure Function ("NEF") (which is responsible for making network data and resources easily accessible to customers and network partners, e.g., via one or more APIs), a Network Repository Function ("NRF") (which provides NF service registration and discovery, enabling NFs to identify appropriate services in one another and communicate with each other over Application Programming Interfaces ("APIs")), or other NFs defined for the 5GC. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. A network instance may be identified by a single Network Slice Selection Assistance Information ("S-NS-SAI"), while a set of network slices for which the remote unit 105 is authorized to use is identified by NSSAI. In certain embodiments, the various network slices may include separate instances of network functions, such as the SMF and UPF 141. In some embodiments, the different network slices may share some common network functions, such as the AMF 143. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 140. Moreover, where the mobile core network 140 comprises an EPC, the depicted network functions may be replaced with appropriate EPC entities, such as a Mobility Management Entity ("MME"), Serving Gateway ("S-GW"), P-GW, Home Subscriber Server ("HSS"), and the like.

While FIG. 1 depicts components of a 5G RAN and a 5G core network, the described embodiments for using a pseudonym for access authentication over non-3GPP access apply to other types of communication networks and RATs, including IEEE 802.11 variants, GSM, GPRS, UMTS, LTE variants, CDMA 2000, Bluetooth, ZigBee, Sigfox, and the like. For example, in an 4G/LTE variant involving an EPC, the AMF 143 may be mapped to an MME, the SMF mapped to a control plane portion of a P-GW and/or to an MME, the UPF 141 may be mapped to an S-GW and a user plane portion of the P-GW, the UDM/UDR 149 may be mapped to an HSS, etc.

As depicted, a remote unit 105 (e.g., a UE) may connect to the mobile core network (e.g., to a 5G mobile communication network) via two types of accesses: (1) via 3GPP access network 120 and (2) via a non-3GPP access network 130. The first type of access (e.g., 3GPP access network 120) uses a 3GPP-defined type of wireless communication (e.g., NG-RAN) and the second type of access (e.g., non-3GPP access network 130) uses a non-3GPP-defined type of wireless communication (e.g., WLAN). The 5G-RAN 115 refers to any type of 5G access network that can provide access to the mobile core network 140, including the 3GPP access network 120 and the non-3GPP access network 130.

As background, regarding PDCCH in NR, according to section 7.3.2 in 3GPP TS 38.211, the PDCCH consists of the following main components for transmission with CP-OFDM.

1. Control-Channel Element ("CCE")

A physical downlink control channel consists of one or more CCEs as indicated in Table 1.

TABLE 1

| Supported PDCCH aggregation levels | |
| --- | --- |
| Aggregation level | Number of CCEs |
| 1 | 1 |
| 2 | 2 |
| 4 | 4 |
| 8 | 8 |
| 16 | 16 |

2. CORESET

A control-resource set consists of $N_{RB}^{CORESET}$ resource blocks in the frequency domain and $N_{symb}^{CORESET} \in \{1,2,3\}$ symbols in the time domain.

A control-channel element consists of 6 resource-element groups ("REGs") where a resource-element group equals one resource block during one OFDM symbol. Resource-element groups within a control-resource set are numbered in increasing order in a time-first manner, starting with 0 for the first OFDM symbol and the lowest-numbered resource block in the control resource set.

A UE can be configured with multiple control-resource sets. Each control-resource set is associated with one CCE-to-REG mapping only.

The CCE-to-REG mapping for a control-resource set can be interleaved or non-interleaved and is described by REG bundles:

i. REG bundle i is defined as REGs {iL, iL+1, . . . , iL+L−1} where L is the REG bundle size, i=0, 1, . . . , $N_{REG}^{CORESET}/L-1$, and $N_{REG}^{CORESET}=N_{RB}^{CORESET}N_{symb}^{CORESET}$ is the number of REGs in the CORESET;

ii. CCE j consists of REG bundles {f(6j/L), f(6j/L+1), . . . , f(6j/L+6/L−1)} where f(·) is an interleaver.

For non-interleaved CCE-to-REG mapping, L=6 and f(x)=x.

For interleaved CCE-to-REG mapping, L∈{2,6} for $N_{symb}^{CORESET}=1$ and L∈{$N_{symb}^{CORESET}$, 6} for $N_{symb}^{CORESET}$∈{2,3}. The interleaver is defined by $$f(x) = (rC + c + n_{shift}) \bmod (N_{REG}^{CORESET}/L)$$

$$x = cR + r$$

$$r = 0, 1, \ldots, R-1$$

$$c = 0, 1, \ldots, C-1$$

$$C = N_{REG}^{CORESET}/(LR)$$

where R∈{2,3,6}

The UE is not expected to handle configurations resulting in the quantity C not being an integer.

For a CORESET configured by the ControlResourceSet IE:

i. $N_{RB}^{CORESET}$ is given by the higher-layer parameter frequency DomainResources;

ii. $N_{symb}^{CORESET}$ is given by the higher-layer parameter duration, where $N_{symb}^{CORESET}=3$ is supported only if the higher-layer parameter dmrs-TypeA-Position equals 3;

iii. interleaved or non-interleaved mapping is given by the higher-layer parameter cce-REG-Mapping Type;

iv. L equals 6 for non-interleaved mapping and is given by by the higher-layer parameter reg-BundleSize for interleaved mapping;

v. R is given by the higher-layer parameter interleaverSize;

vi. $n_{shift}$∈{0, 1, . . . , 274} is given by the higher-layer parameter shiftIndex if provided, otherwise $n_{shift}=N_{ID}^{cell}$;

vii. for both interleaved and non-interleaved mapping, the UE may assume 1. the same precoding being used within a REG bundle if the higher-layer parameter precoderGranularity equals sameAsREG-bundle;

2. the same precoding being used across the all resource-element groups within the set of contiguous resource blocks in the CORESET, and that no resource elements in the CORESET overlap with an SSB or LTE cell-specific reference signals as indicated by the higher-layer parameter lte-CRS-ToMatchAround or additionalLTE-CRS-ToMatchAroundList, if the higher-layer parameter precoderGranularity equals allContiguousRBs.

For CORESET 0 configured by the ControlResourceSetZero IE:

i. $N_{RB}^{CORESET}$ and $N_{symb}^{CORESET}$ are defined by clause 13 of [5, TS 38.213];

ii. the UE may assume interleaved mapping iii. L=6;

iv. R=2;

V. $n_{shift}=N_{ID}^{cell}$;

vi. the UE may assume normal cyclic prefix when CORESET 0 is configured by MIB or SIB1;

vii. the UE may assume the same precoding being used within a REG bundle.

3. Scrambling

The UE shall assume the block of bits b(0), . . . , b($M_{bit}$−1), where $M_{bit}$ is the number of bits transmitted on the physical channel, is scrambled prior to modulation, resulting in a block of scrambled bits $\tilde{b}$(0), . . . , $\tilde{b}$($M_{bit}$−1) according to $$\tilde{b}(i) = (b(i) + c(i)) \bmod 2$$

where the scrambling sequence c(i) is given by clause 5.2.1. The scrambling sequence generator shall be initialized with $$c_{init} = (n_{RNTI} \cdot 2^{16} + n_{ID}) \bmod 2^{31}$$

where
i. for a UE-specific search space as defined in clause 10 of [5, TS 38.213], $n_{ID}$∈{0, 1, . . . , 65535} equals the higher-layer parameter pdcch-DMRS-ScramblingID if configured, ii. $n_{ID}=N_{ID}^{cell}$ otherwise and where
i. $n_{RNTI}$ is given by the C-RNTI for a PDCCH in a UE-specific search space if the higher-layer parameter pdcch-DMRS-ScramblingID is configured, and ii. $n_{RNTI}=0$ otherwise.

4. PDCCH Modulation

The UE shall assume the block of bits $\tilde{b}$(0), . . . , $\tilde{b}$($M_{bit}$−1) to be QPSK modulated as described in clause 5.1.3, resulting in a block of complex-valued modulation symbols d(0), . . . , d($M_{symb}$−1).

5. Mapping to Physical Resources

The UE shall assume the block of complex-valued symbols d(0), . . . , d ($M_{symb}$−1) to be scaled by a factor $\beta_{PDCCH}$ and mapped to resource elements (k, l)$_{p,\mu}$ used for the monitored PDCCH and not used for the associated PDCCH DMRS in increasing order of first k, then l. The antenna port p=2000.

In this disclosure, configuration and/or signaling of multiple DFTs is proposed in DL and/or UL to allow multiplexing of one or multiple channels, CORESETs, RSs, and/or the like within a same time symbol in different frequency resources. In one embodiment, in order to apply multiple DFT-s-OFDM as a waveform for downlink channels where multiple DFTs can be applied at the transmitter before the inverse fast Fourier transform ("IFFT") or inverse discrete Fourier transform ("IDFT") to allow for multiplexing different downlink channels on the same time symbol and/or multiplexing different CORESETs for a UE on the same time symbol and/or multiplexing control data with DM-RS for CORESET on the same time symbol, it is proposed to be configured with multiple DFTs configuration and corresponding mapping of the DFTs output to subcarriers.

Figure 2:
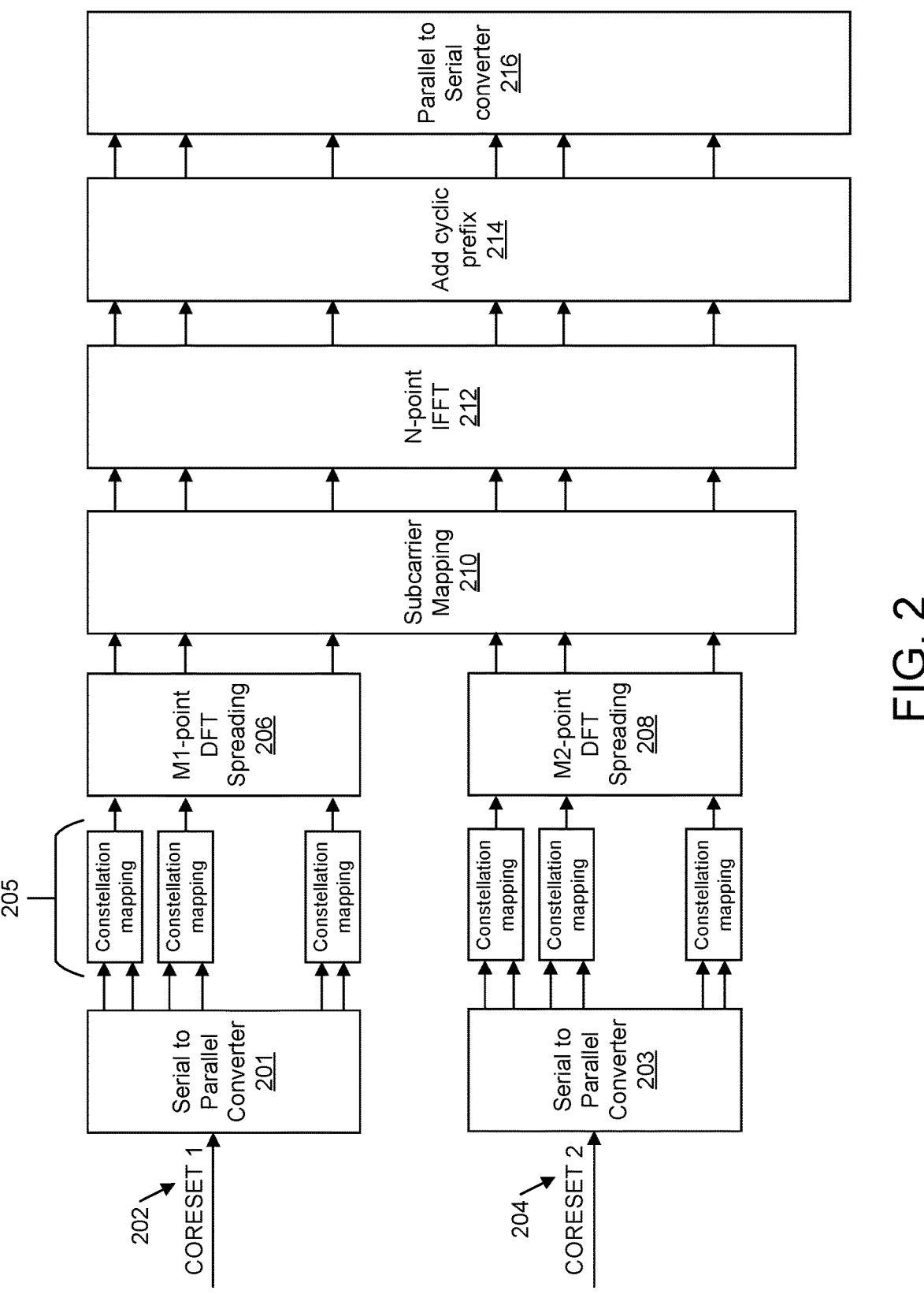
FIG. 2 depicts an example of multiple DFT-s-OFDM for multiplexing control/data on a symbol.

FIG. 2 depicts one example of multiplexing two CORESETs with two DFTs, where corresponding CORESET configuration enhancements are implemented, as proposed in the following embodiments. In particular, FIG. 2 illustrates one embodiment of applying multiple DFTs at the transmitter side. As shown in FIG. 2, one M1-point DFT 206 for CORESET 1 202 spreading and one M2-point DFT 208 for CORESET 2 204 spreading are applied (after applying constellation mapping 205 from a serial to parallel converter 201, 203), followed by localized or distributed mapping 210 to N subcarriers and followed by N-point IFFT 212 or IDFT such that M1+M2<=N. In one embodiment, a CP is added 214 and a parallel to serial converter is applied 216.

Applying multiple DFT-s-OFDM, in one embodiment, provides better performance in terms of PAPR compared to CP-OFDM, while at the same time providing more flexibility in terms of multiplexing multiple CORESETs with same or different sizes on a time symbol, and flexibility in power/energy per resource element ("EPRE") ratio between different channels and/or signals in comparison to single DFT-s-OFDM that is currently applied in NR UL transmission.

Figure 3:
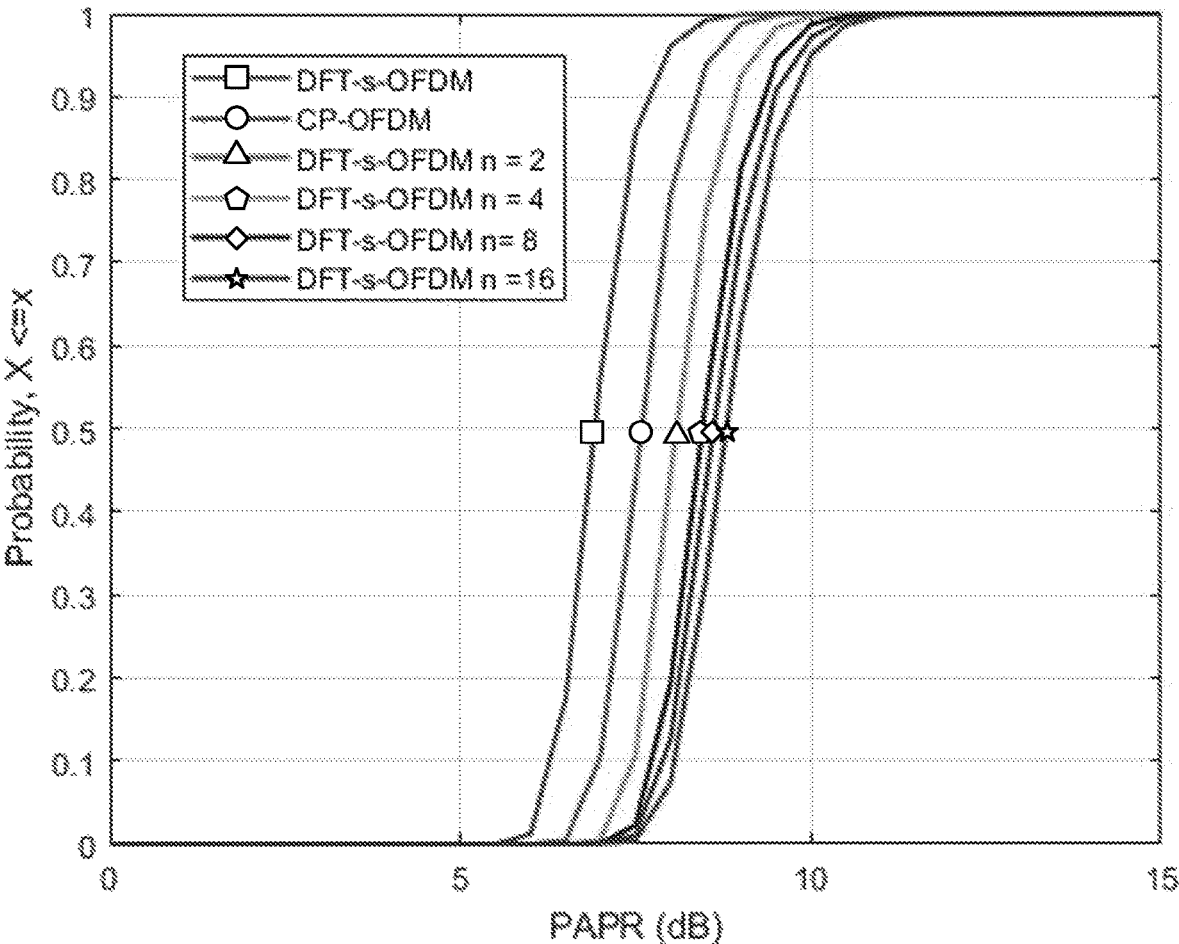
FIG. 3 depicts a CDF plot of PAPR comparison between CP-OFDM, DFT-s-OFDM, and multiple DFT-s-OFDM.

In one embodiment, multi-DFT-s-OFDM can provide multiplexing capability for both control and DM-RS for a CORESET on a symbol, but with better PAPR compared to CP-OFDM. In addition, in one embodiment, such a waveform allows for multiplexing PDCCH CORESET 0 with SSB using two DFTs before the IFFT or IDFT. A PAPR comparison between multiple DFT-s-OFDM, CP-OFDM, and DFT-s-OFDM is shown in FIG. 3 (n denotes the number of DFT operations). FIG. 3 depicts the benefit of using multiple DFTs. Basically, in terms of PAPR, CP-OFDM is worst and single DFT-s-OFDM is best. Using multiple DFTs provide better results than CP-OFDM, but worse than single DFT-s-OFDM, but with better multiplexing capability. Therefore, in one embodiment, using multiple DFTs for DFT-s-OFDM can provide good trade-off. In FIG. 3, the results are shown for an IFFT or IDFT size of 2048. It is evident from FIG. 3 that PAPR of multiple DFT-s-OFDM reaches to the CP-OFDM with increasing number of DFT operations, it offers a PAPR compromise between CP-OFDM and DFT-s-OFDM, but on the other hand offers more frequency domain multiplexing flexibility.

In a first embodiment, directed to multiple DFT-s-OFDM for multiple CORESET multiplexing on a symbol. K DFTs are applied at the transmitter for multiplexing K CORESETs on a bandwidth part ("BWP") for a UE, where the length of each of the K DFTs is equal to the CORESET length in frequency (e.g., number of resource elements). In one embodiment, the UE is configured by the network (e.g., a gNB) with ControlResourceSet information element, shown in FIG. 4, where a DFT field is introduced that can indicate the number of DFTs 402, the size of each of the DFTs 404, and the location/offset applicable for the corresponding CORESET. In some embodiments, only the same size of multiple DFTs is configured for a CORESET. In some embodiments, only one DFT is associated with one CORE-SET and only the corresponding length is configured. In some embodiments, only one DFT is associated with one CORESET and the DFT size is equal to the number of resource elements in a symbol of the CORESET.

In some embodiments, the maximum size of the bitfield frequencyDomainResources 406 in the ControlResourceSet information element is equal to the maximum number of DFTs allowed on a symbol within a BWP, where each bitfield corresponds to contiguous number of resources elements (e.g., a group of 6 resource blocks ("RBs") in the BWP) that is equal to the DFT length. The number of bits that are set to "1" corresponds to number of DFTs that are associated with a single CORESET. In some embodiments, only one DFT can be associated with a CORESET and only one of the bit values could be set to "1" for the frequencyDomainResources field 406.

Based on which field is set to "1", the output of the DFT is mapped to corresponding resource elements (subcarriers) in frequency domain. In some embodiments, explicit field for DFT is not included in the ControlResourceSet information element and the number of DFTs for a CORESET can be inferred from the number of bits in frequencyDomainResources field 406 that are set to "1". In this case, the size of DFT is equal to the number of resource elements (subcarriers) that are indicated by a single bit of frequencyDomainResources field 406. For example, if the number of subcarriers indicated by single bit of frequencyDomainResources field 406 is 480 subcarriers, then the DFT size to be used for CORESET transmission at the gNB and at the UE for reception of the CORESET is 480.

In some embodiments, the number of DFTs and the size of each of the DFTs is determined (e.g., implicitly) based on the frequencyDomainResources field 406. In one example, the frequencyDomainResources field 406 comprising a number of disjoint sets of consecutive bits each with value set to '1' (with at least one bit of bit value of '0' between any two sets, with a first set of consecutive bits with value set to '1' of first size/length, a second set of consecutive bits with value set to '1' of second size/length, the number of DFTs is equal to the number of disjoint sets, the size of the first DFT is equal to the number of resource elements in a symbol corresponding to the first set based on the first size/length, and the size of the second DFT is equal to the number of resource elements in a symbol corresponding to the second set based on the second size/length.

In some embodiments, one of the number of DFTs and the size of DFT higher layer parameter is indicated, with the other parameter determined based on the frequencyDomainResources field 406. For example, if the number of DFTs parameter is indicated, the bits in the frequencyDomainResources field 406 with value set to '1' are grouped into numberofDFTs 402 groups where at least a numberofDFTs−1 groups are equal-sized groups (e.g., have the same number of bits with value of '1') with possibly the last group having one less number of bits with value of '1' compared to the equal-size groups. The size of DFT for each group is determined based on (e.g., is equal to) the number of resource elements in a symbol corresponding to resources associated with each group. In another example, if the size of DFT parameter is indicated, each DFT is assumed to correspond to the sizeofDFT 404, and the number of DFTs is determined by dividing the resources corresponding to the bits in the frequencyDomainResources 406 field with value set to '1' by the sizeofDFT 404 with the UE assuming or expecting an integer number of number of DFTs.

The number of DFTs and the mapping in frequency (based on frequencyDomainResources field 406 with value set to '1') may be configured by the network based on the expected frequency selectivity and the required PAPR/CM for the transmission.

Figure 5A:
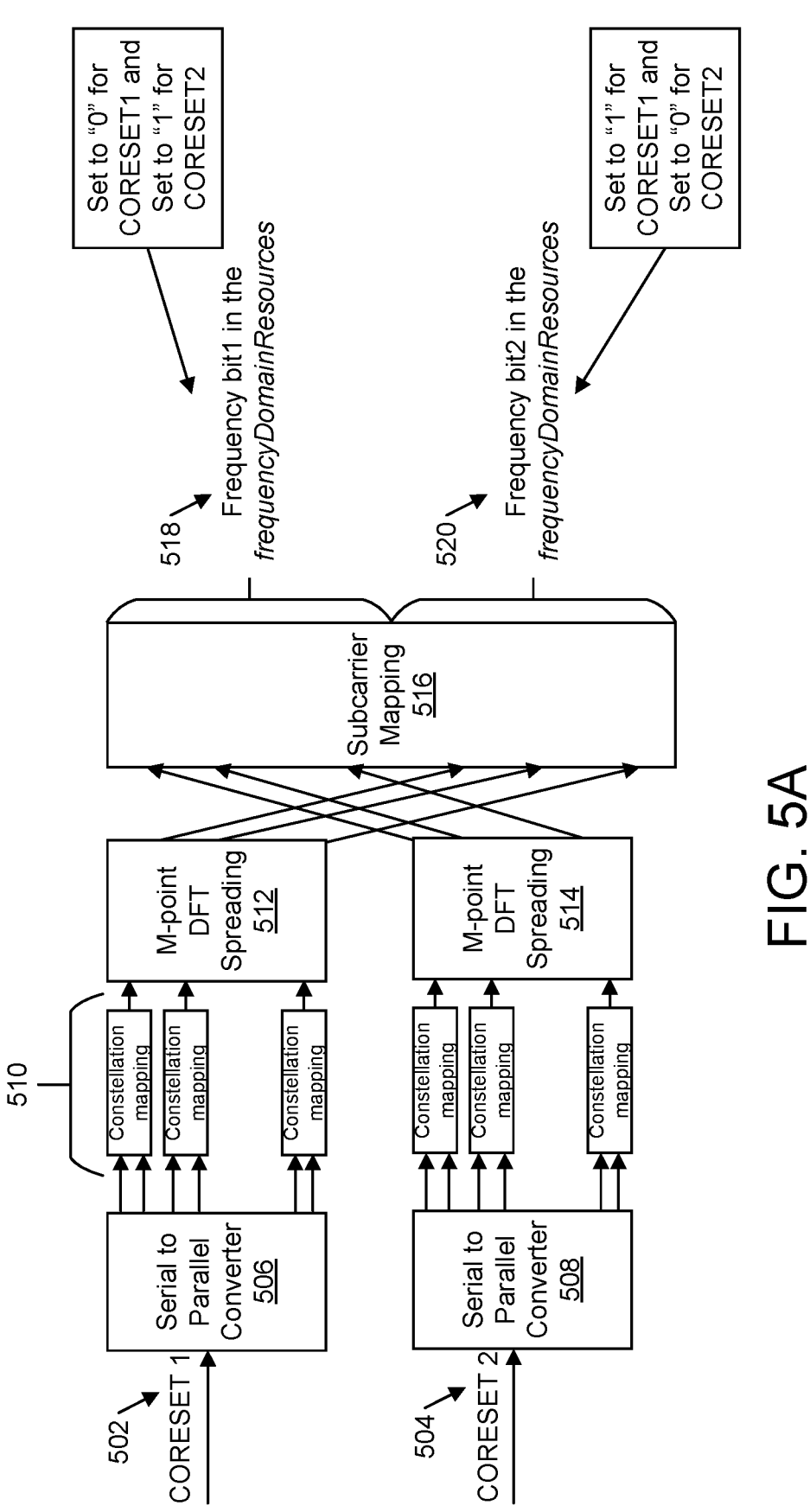
FIG. 5A depicts a mapping of DFT output to subcarriers for multiple CORESETs on a symbol in contiguous manner.

FIG. 5A provides an illustration of how multiple CORE-SETs can be mapped onto the subcarriers in a symbol, where each of the CORESETs is mapped with contiguous frequency resources. In FIG. 5A, 2 CORESETs 502, 504 are configured to a UE and in principle two DFTs 512, 514 can be used each of size M (in general, the size of each DFT corresponding to each DFT can be different) for mapping two CORESETs in the frequency (after applying serial to parallel converters 506, 508 and constellation mapping 510). Depending on how the bits in the frequency DomainResources field are set, the exact mapping is determined. Also, the number of subcarriers corresponding to each bit is equal to the size of the DFT, e.g., size M.

In the depicted example, after the DFTs 512, 514 and subcarrier mapping 516 is applied, only a size 2 bitfield is used, where bit1 518 (e.g., the right-most or least significant bit) indicates the top half of the frequency resources and bit2 520 (e.g., the left-most or most significant bit) indicates the bottom half of the frequency resources. For CORESET1 502, only the most significant bit is set to "1" and therefore CORESET1 502 is mapped to the bottom half of the frequency resources and for CORESET2 504, only the least significant bit is set to "1" and therefore CORESET2 504 is mapped to the top half of the frequency resources. In some examples, only a single CORESET can be configured to a UE in a symbol and only a single DFT can be applied.

Figure 5B:
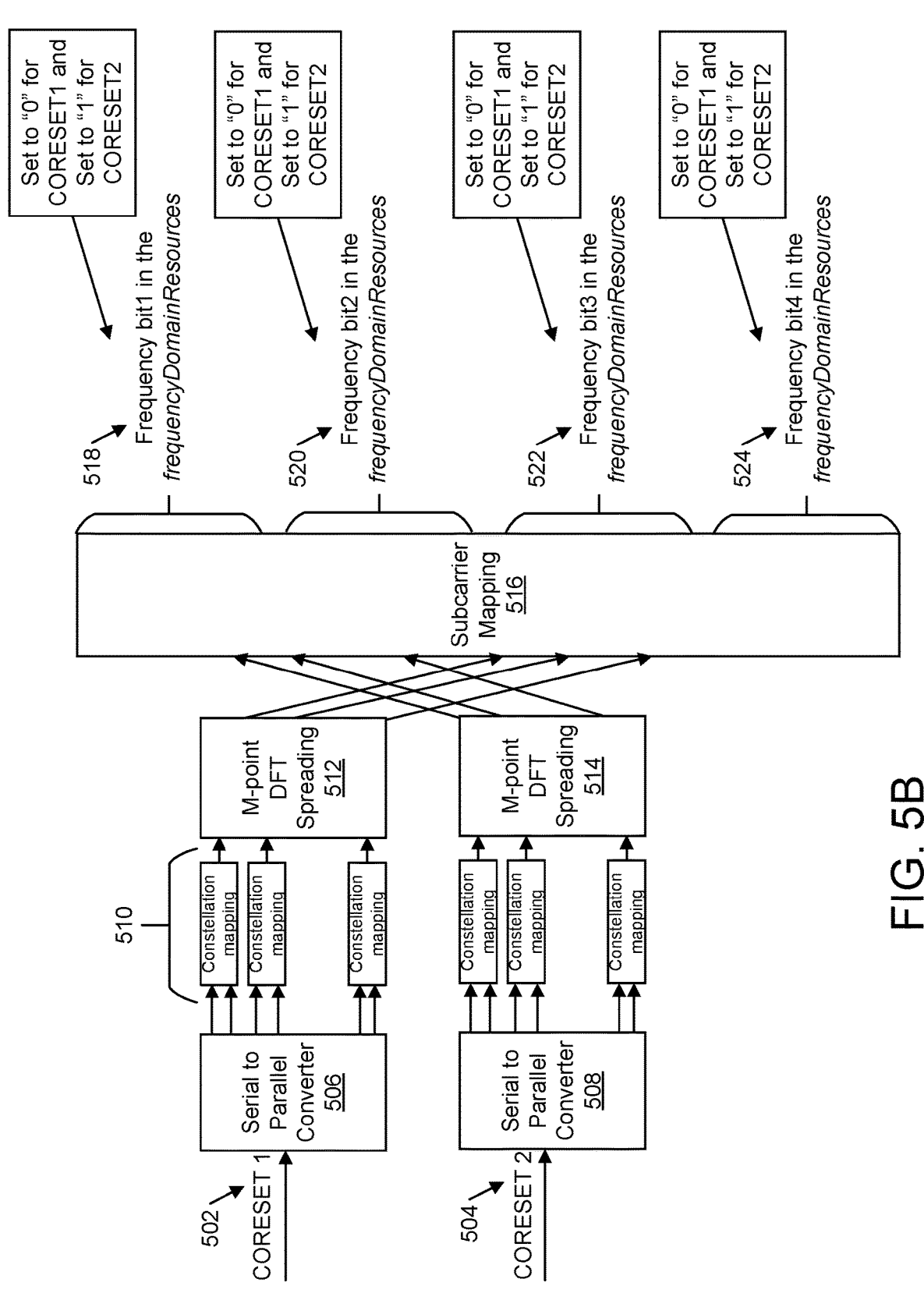
FIG. 5B depicts a mapping of DFT output to subcarriers for multiple CORESETs on a symbol in contiguous manner

FIG. 5B provides an illustration of how multiple CORE-SETs can be mapped onto the subcarriers in a symbol, where each of the CORESET is mapped in an interlaced or distributed manner in frequency (in general, the CORESET may be mapped in a localized manner in frequency and the signaling as described in this example can also be applicable). In FIG. 5B, 2 CORESETs 502, 504 are configured to a UE and the DFT size M 512, 514 for mapping two CORESETs in the frequency. Depending on how the bits in the frequencyDomainResources field are set, the exact mapping is determined.

In this example, the number of bits and the number of frequency resources indicated by each bit is not directly related to the DFT size. The number of frequency resources indicated by each bit is equal to the number of contiguous resources in frequency resources. In this example, the frequencyDomainResources field has size of 4 bits, where the bit1 518 (e.g., the least significant bit) represents the first M/2 subcarriers of CORESET2 504 at the top of frequency region, followed by bit2 520 that represents the first M/2 subcarriers of CORESET1 502, followed by bit3 522 that represents the last M/2 subcarriers of CORESET2 504. and followed by bit4 524 (e.g., the most significant bit) that represents the last M/2 subcarriers of CORESET1 502 at the bottom of the frequency region. For CORESET1 502, bit2 520 and bit4 524 are set to "1" and for CORESET2 504, bit 1 518 and bit3 522 are set to "1".

In an alternative embodiment, multiple DFT operations are applied to each CORESET 502, 504. The CCEs of the CORESET in time domain are grouped in a number of groups Mg with the same or different sizes and a DFT operation, for example, size M/Mg is applied on each group of CCEs where M is the CORESET size. The resulting contiguous frequency resources of each DFT 512, 514 are flexibly mapped 516 to the configured subcarriers according to frequency Domain Resources.

In a second embodiment, directed to multiple DFT-s-OFDM for multiplexing control data and DM-RS for a CORESET, one or multiple DFTs can be applied for a single CORESET on a symbol. In some embodiments, 2 DFTs are applied for a single CORESET, where DFT1 is used for spreading the DM-RS associated with CORESET for channel estimation and DFT2 is used for spreading the control information to be transmitted in the CORESET. The output of these two DFTs may be mapped onto the subcarriers of the same symbol and the mapping can be indicated by the frequencyDomainResources field in the ControlResourceSet information element, e.g., depicted in FIG. 4.

In some embodiments, separate fields for DM-RS 602 and control information 604 are included to indicate the DFT size and also mapping to frequency resources, as illustrated in FIG. 6. In some embodiments some of the fields related to DFT could be common for both DM-RS and control. In order to perform frequency domain channel estimation at the receiver, DFT spreading is applied to the generated DM-RS sequence at the UE with the same DFT size used at the gNB.

In some embodiments, the number of DFTs and the size of DFT for DM-RS may be determined similarly to that for CORESET as described in the first embodiment above. This would allow for different multiplexing pattern od DM-RS resources and control data resources within a symbol.

Figure 7A:
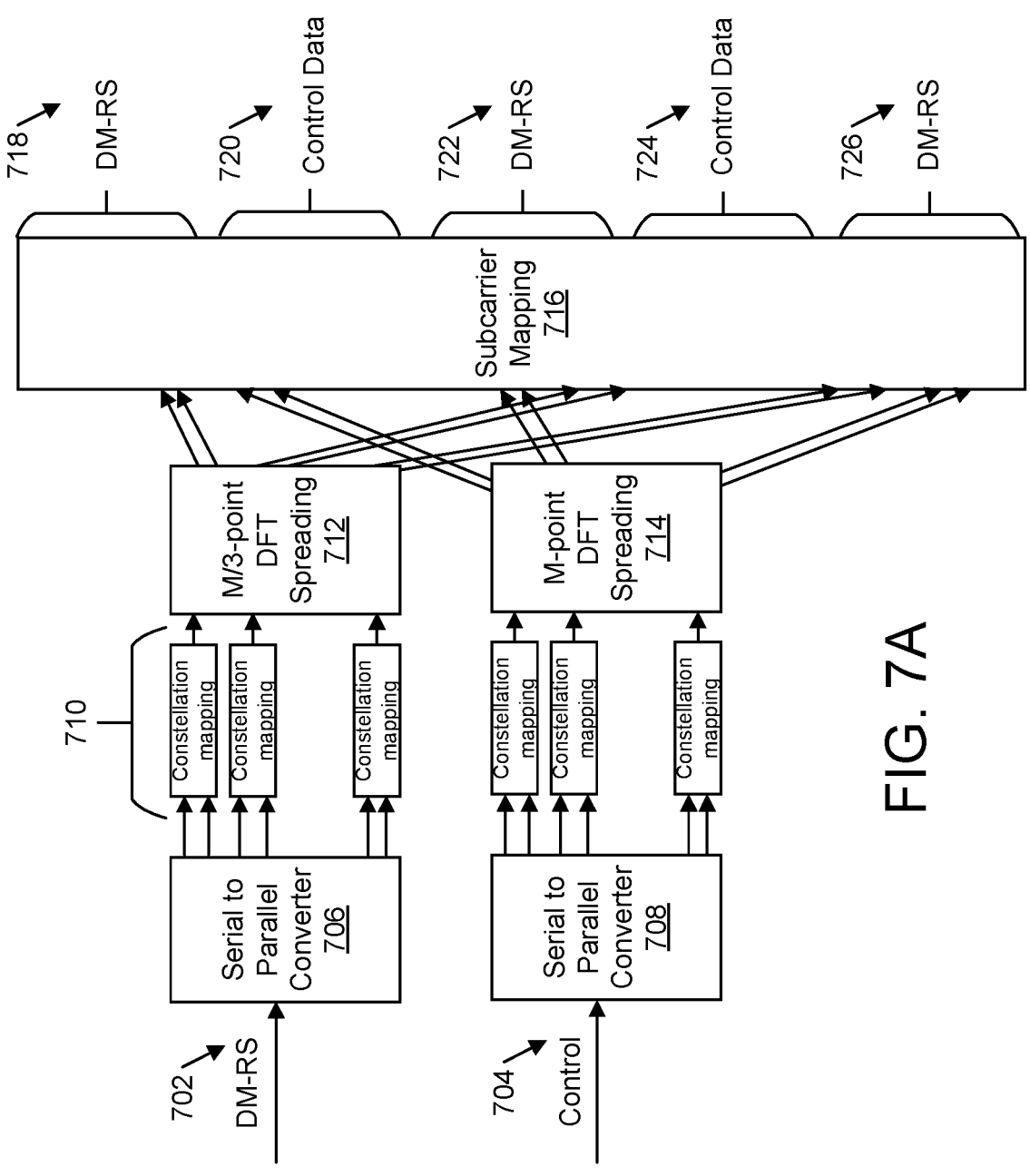
FIG. 7A depicts mapping of DFT output to subcarriers for single CORESET for multiplexing DM-RS and control data.

FIG. 7A provides an illustration of how DM-RS 702 and control data 704 for a CORESET can be mapped 716 onto the subcarriers in a symbol in an interlaced manner in frequency. In FIG. 7A, the DM-RS 702 is generated in time domain and then a separate DFT 712 is used for DM-RS 702 and then the DFT output is multiplexed in distributed manner with control data 704. In this example, two DFTs 712, 714 are applied (after applying serial to parallel converters 706, 708 and constellation mapping 710), where DFT1 714 of size M is used for spreading control data and DFT2 712 of size M/3 is used for spreading DM-RS 702. The ratio of the DFT sizes could correspond to the ratio between DM-RS overhead and control data in a symbol. The interlacing pattern is determined based on the bit values in the frequencyDomainResources field for both DM-RS 702 and control 704. Also, the ratio of overhead can be dependent upon how many resources are indicated by single bit of the fields for each of DM-RS 702 and control 704.

In an alternative embodiment, multiple DFT operations are applied to the DM-RS 702. The time domain DM-RS resources, in one embodiment, are grouped in a number of groups/bundles with the same or different sizes and a DFT operation is applied on each bundle. The resulting contiguous frequency resources of each DFT 712, 714 are flexibly mapped/distributed 716 in frequency grid to cover the control symbol in frequency. The number of DMRS bundles and the mapping spacing in frequency 716 can be configured by the network based on the expected frequency selectivity and the required PAPR/CM for the transmission.

Figure 7B:
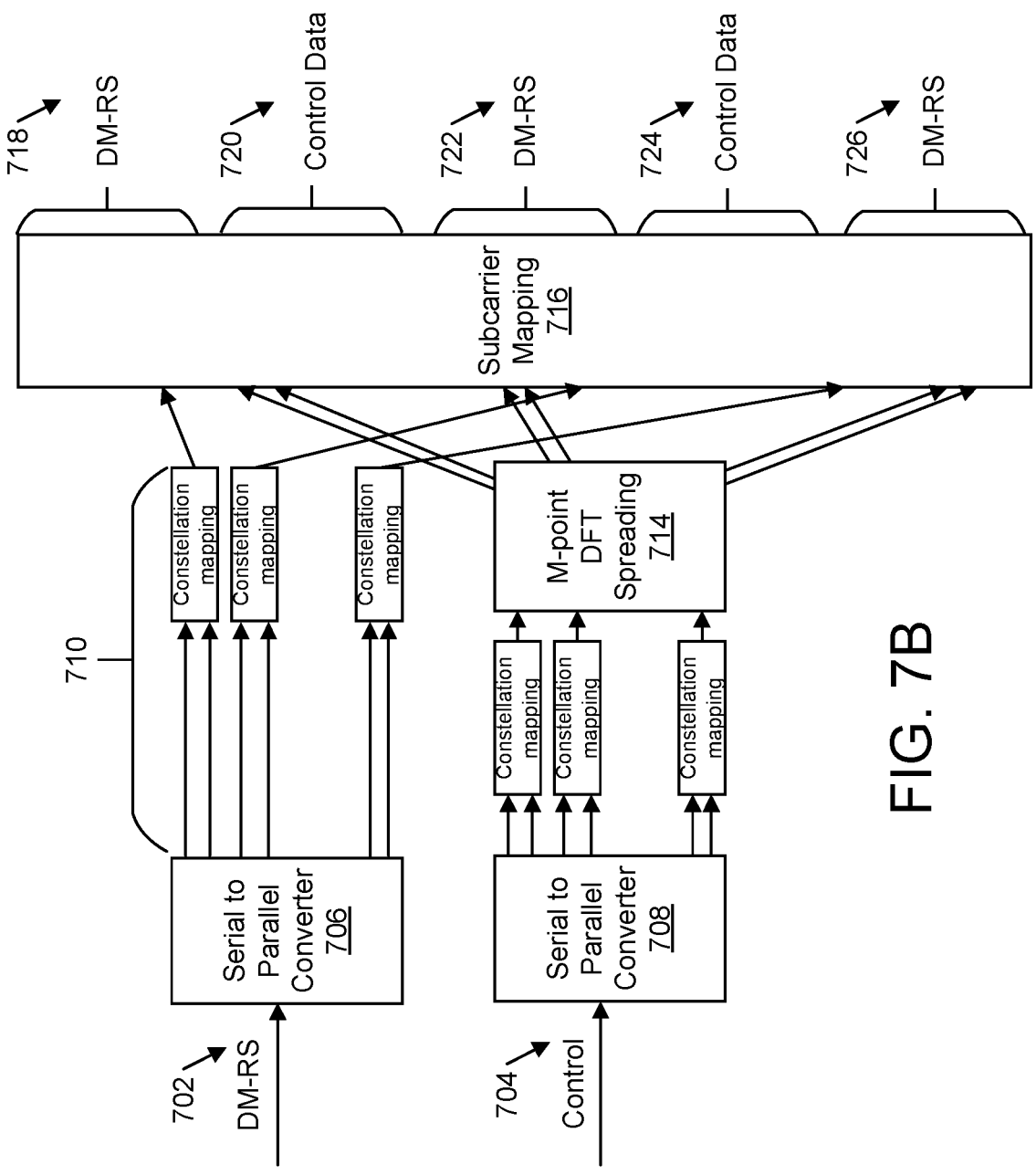
FIG. 7B depicts mapping of DFT output to subcarriers for single CORESET for multiplexing DM-RS that is generated in frequency domain and control data.

In some embodiments, the DM-RS 702 is generated in frequency domain and is not required to be spread by DFT 714 and only the control data 704 is spread by a DFT 714, as illustrated in FIG. 7B. The output of the DFT 714 for control data 704 and frequency domain DM-RS 702 sequence are then mapped 716 to the subcarriers and followed by IFFT or IDFT.

In some embodiments, when only one DFT 714 is applied for one CORESET in a symbol, then only control data 704 or DM-RS 702 for the CORESET can be transmitted on a symbol. In some of the embodiments, the DM-RS 702 is transmitted at least on the first symbol of multiple symbol length CORESET.

In a third embodiment, two DL channels or signals are multiplexed on the same time symbol by using multiple DFTs. In some embodiments, PDCCH with CORESET0 is multiplexed with SSB in frequency, e.g., multiplexing patterns 2 and 3, where at least one DFT is applied for spreading the CORESET0 and at least one DFT is applied for spreading the SSB. In some embodiments, common or UE-specific PDCCH is multiplexed with PDSCH in a symbol by applying multiple DFTs, where at least one DFT is applied for spreading PDCCH CORESET and at least one DFT is applied for spreading the PDSCH. In some embodiments, same subcarrier spacing is configured for PDCCH CORESET0 and SSB and therefore, only single IFFT or IDFT is applied at the transmitter for generating the time-domain signal. In some embodiments, different subcarrier spacing is configured for PDCCH CORESET0 and SSB and therefore, two different IFFTs or IDFTs are applied at the transmitter for generating the time-domain signal.

Figure 8:
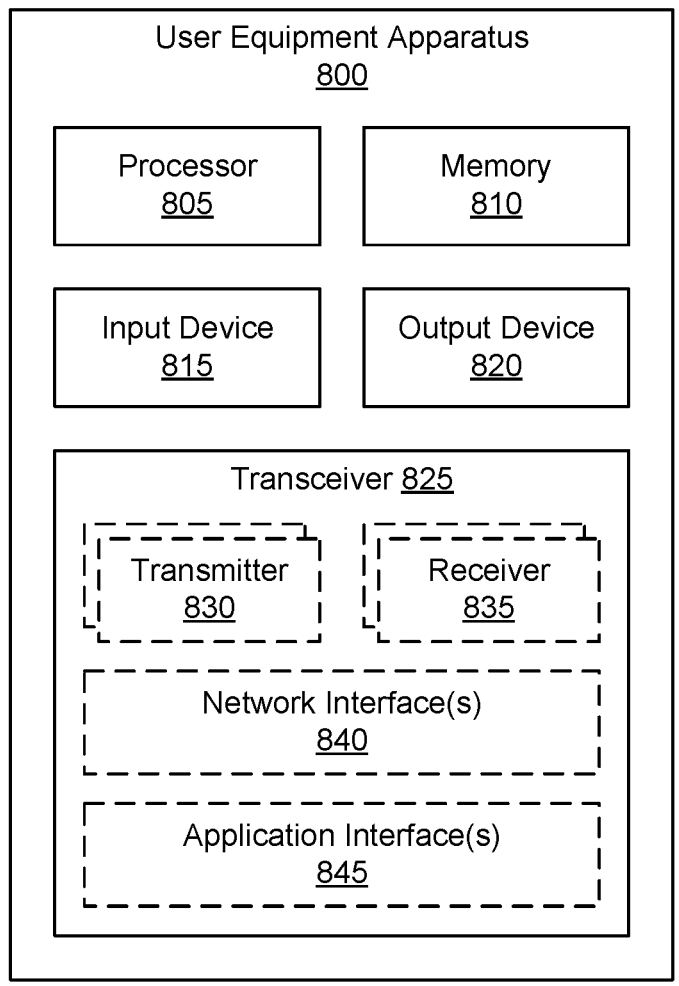
FIG. 8 is a block diagram illustrating one embodiment of a user equipment apparatus that may be used for multiple discrete Fourier transforms for transmission and reception.

FIG. 8 depicts a user equipment apparatus 800 that may be used for multiple discrete Fourier transforms for transmission and reception, according to embodiments of the disclosure. In various embodiments, the user equipment apparatus 800 is used to implement one or more of the solutions described above. The user equipment apparatus 800 may be one embodiment of the remote unit 105 and/or the UE, described above. Furthermore, the user equipment apparatus 800 may include a processor 805, a memory 810, an input device 815, an output device 820, and a transceiver 825.

In some embodiments, the input device 815 and the output device 820 are combined into a single device, such as a touchscreen. In certain embodiments, the user equipment apparatus 800 may not include any input device 815 and/or output device 820. In various embodiments, the user equipment apparatus 800 may include one or more of: the processor 805, the memory 810, and the transceiver 825, and may not include the input device 815 and/or the output device 820.

As depicted, the transceiver 825 includes at least one transmitter 830 and at least one receiver 835. In some embodiments, the transceiver 825 communicates with one or more cells (or wireless coverage areas) supported by one or more base units 121. In various embodiments, the transceiver 825 is operable on unlicensed spectrum. Moreover, the transceiver 825 may include multiple UE panel supporting one or more beams. Additionally, the transceiver 825 may support at least one network interface 840 and/or application interface 845. The application interface(s) 845 may support one or more APIs. The network interface(s) 840 may support 3GPP reference points, such as Uu, N1, PC5, etc. Other network interfaces 840 may be supported, as understood by one of ordinary skill in the art.

The processor 805, in one embodiment, may include any known controller capable of executing computer-readable instructions and/or capable of performing logical operations. For example, the processor 805 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 805 executes instructions stored in the memory 810 to perform the methods and routines described herein. The processor 805 is communicatively coupled to the memory 810, the input device 815, the output device 820, and the transceiver 825. In certain embodiments, the processor 805 may include an application processor (also known as "main processor") which manages application-domain and operating system ("OS") functions and a baseband processor (also known as "baseband radio processor") which manages radio functions.

In various embodiments, the processor 805 and transceiver 825 control the user equipment apparatus 800 to implement the above described UE behaviors. In one embodiment, the transceiver 825 receives a first configuration from a network to apply multiple discrete Fourier transform ("DFT")-based waveforms at one or more of a transmitter and a receiver. In one embodiment, the transceiver 825 receives a second configuration from the network for a physical channel, the second configuration comprising a number of DFTs to apply at the transmitter for transforming one or more time-domain signals and/or channels to a frequency domain, a size of each of the DFTs, and a mapping pattern for mapping the output of each of the DFTs onto subcarriers in the frequency domain for a time symbol.

In some alternate embodiments, only the first configuration is signaled and the other configurations for multiple DFT-S-OFDM waveform are pre-configured or fixed in specifications. In one embodiment, based on the first configuration, multiple DFT-s-OFDM is applied to both DL and UL. In an alternate embodiments, the first configuration is separate for UL and DL and this would allow to apply multiple DFT-s-OFDM for either UL, or DL or both. In some embodiments, multiple DFT-s-OFDM is applied only in certain cases where multiplexing in frequency domain is needed for different physical channels or signals, otherwise, even if configured, multiple DFT-s-OFDM is not applied. Such restriction can be fixed or pre-configured.

In one embodiment, the transceiver 825 receives a third configuration from the network for determining, based on the second configuration, an inverse-DFT ("IDFT") configuration comprising a number of IDFTs to apply on the time symbol to receive one or more signals, a size of each of the IDFTs, and a de-mapping pattern from subcarriers to the IDFTs. In one embodiment, the processor 805 performs multiple DFT-based transmissions on a time-domain symbol transmitted to the network based on the first and second configurations and performs multiple IDFT-based receptions of a time-domain symbol received from the network, based on the IDFT configuration.

In one embodiment, the first, the second, and the third configurations each form a portion of a single configuration. In one embodiment, the one or more transformations performed on the physical channel time-domain symbol include at least one transformation selected from the group of: removing a cyclic prefix part of a signal corresponding to a transmitter side, passing the signal from a serial to a parallel converter, performing fast Fourier transform ("FFT") to convert the signal into frequency domain subcarriers, and de-mapping subcarriers.

In one embodiment, the transceiver 825 receives a configuration for at least one control resource set ("CORESET"), the configuration comprising an indication of a number of DFTs used for generating control data and a corresponding demodulation reference signal ("DM-RS"), a length of each of the DFTs to determine a length of the CORESET in the frequency domain, and the mapping pattern for multiplexing the control data and/or the corresponding DM-RS on a time symbol.

In one embodiment, the processor 805 applies a first DFT to the CORESET for transforming time-domain control data to the frequency domain and applies a second DFT to the CORESET for transforming a time-domain DM-RS sequence to the frequency domain, wherein a total length of the CORESET in the frequency domain is equal to the sum length of the output of the first and second DFTs.

In one embodiment, the processor 805 multiplexes output of the first DFT applied to the time-domain control data with output of the second DFT applied to the DM-RS sequence onto the subcarriers in the frequency domain according to the mapping pattern.

In one embodiment, the processor 805 applies one DFT for transforming the time-domain control data to the frequency domain for a CORESET and applies no DFT to the corresponding DM-RS sequence wherein the DM-RS sequence is generated in the frequency domain and the total length of the CORESET in the frequency domain is equal to the sum of the length of the DFT output of the control data and the number of DM-RS frequency domain symbols.

In one embodiment, the processor 805 directly multiplexes the output of the DFT that is applied to the control data with the frequency domain DM-RS sequence onto the subcarriers in the frequency domain according to the mapping pattern.

In one embodiment, the processor 805, in response to the CORESET duration being more than one symbol, applies different configurations for each of the symbols in terms of the number of DFTs, the length of each of the DFTs, and the mapping of DFT output to subcarriers in the frequency domain.

In one embodiment, the processor 805 configures the CORESET mapping in the frequency domain across different symbols to allow for frequency hopping on the different symbols. In one embodiment, the processor 805, in response to the CORESET duration being more than one symbol, applies the same configuration for each of the symbols.

In one embodiment, the processor 805 configures multiple CORESETs for a UE with independent configurations in terms of the number of DFTs, the length of each of the DFTs, and the mapping of DFT output to subcarriers in frequency domain.

In one embodiment, the processor 805 configures multiple CORESETs for a UE such that the multiple CORESETs are non-overlapping in the frequency domain. In one embodiment, the processor 805 applies a single DFT for the CORESET in one symbol, and, in response to the CORESET duration being at least two symbols, applies time-domain multiplexing between the control data and the corresponding DM-RS for the CORESET.

In one embodiment, the transceiver 825 transmits a DM-RS symbol prior to the control data symbol for the CORESET. In one embodiment, the transceiver 825 receives a configuration for a CORESET containing at least one selected from the group of: an indication for a number of DFTs used for generating the control data and/or corresponding DM-RS, the length of each of the DFTs to determine the length of the CORESET in the frequency domain, a configuration for a synchronization signal block ("SSB") comprising a number of DFTs used for generating the corresponding signal, the length of each of the DFTs to determine the length of a signal in the frequency domain, and a frequency domain multiplexing pattern to multiplex the output of the DFTs for the CORESET and the output of the DFTs for the SSB.

The memory 810, in one embodiment, is a computer readable storage medium. In some embodiments, the memory 810 includes volatile computer storage media. For example, the memory 810 may include a RAM, including dynamic RAM ("DRAM"), synchronous dynamic RAM ("SDRAM"), and/or static RAM ("SRAM"). In some embodiments, the memory 810 includes non-volatile computer storage media. For example, the memory 810 may include a hard disk drive, a flash memory, or any other suitable non-volatile computer storage device. In some embodiments, the memory 810 includes both volatile and non-volatile computer storage media.

In some embodiments, the memory 810 stores data related to multiple discrete Fourier transforms for transmission and reception. For example, the memory 810 may store various parameters, panel/beam configurations, resource assignments, policies, and the like as described above. In certain embodiments, the memory 810 also stores program code and related data, such as an operating system or other controller algorithms operating on the user equipment apparatus 800.

The input device 815, in one embodiment, may include any known computer input device including a touch panel, a button, a keyboard, a stylus, a microphone, or the like. In some embodiments, the input device 815 may be integrated with the output device 820, for example, as a touchscreen or similar touch-sensitive display. In some embodiments, the input device 815 includes a touchscreen such that text may be input using a virtual keyboard displayed on the touch-screen and/or by handwriting on the touchscreen. In some embodiments, the input device 815 includes two or more different devices, such as a keyboard and a touch panel.

The output device 820, in one embodiment, is designed to output visual, audible, and/or haptic signals. In some embodiments, the output device 820 includes an electronically controllable display or display device capable of outputting visual data to a user. For example, the output device 820 may include, but is not limited to, an LCD display, an LED display, an OLED display, a projector, or similar display device capable of outputting images, text, or the like to a user. As another, non-limiting, example, the output device 820 may include a wearable display separate from, but communicatively coupled to, the rest of the user equipment apparatus 800, such as a smart watch, smart glasses, a heads-up display, or the like. Further, the output device 820 may be a component of a smart phone, a personal digital assistant, a television, a table computer, a notebook (laptop) computer, a personal computer, a vehicle dashboard, or the like.

In certain embodiments, the output device 820 includes one or more speakers for producing sound. For example, the output device 820 may produce an audible alert or notification (e.g., a beep or chime). In some embodiments, the output device 820 includes one or more haptic devices for producing vibrations, motion, or other haptic feedback. In some embodiments, all, or portions of the output device 820 may be integrated with the input device 815. For example, the input device 815 and output device 820 may form a touchscreen or similar touch-sensitive display. In other embodiments, the output device 820 may be located near the input device 815.

The transceiver 825 communicates with one or more network functions of a mobile communication network via one or more access networks. The transceiver 825 operates under the control of the processor 805 to transmit messages, data, and other signals and also to receive messages, data, and other signals. For example, the processor 805 may selectively activate the transceiver 825 (or portions thereof) at particular times in order to send and receive messages.

The transceiver 825 includes at least transmitter 830 and at least one receiver 835. One or more transmitters 830 may be used to provide UL communication signals to a base unit 121, such as the UL transmissions described herein. Similarly, one or more receivers 835 may be used to receive DL communication signals from the base unit 121, as described herein. Although only one transmitter 830 and one receiver 835 are illustrated, the user equipment apparatus 800 may have any suitable number of transmitters 830 and receivers 835. Further, the transmitter(s) 830 and the receiver(s) 835 may be any suitable type of transmitters and receivers. In one embodiment, the transceiver 825 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 825, transmitters 830, and receivers 835 may be implemented as physically separate components that access a shared hardware resource and/or software resource, such as for example, the network interface 840.

In various embodiments, one or more transmitters 830 and/or one or more receivers 835 may be implemented and/or integrated into a single hardware component, such as a multi-transceiver chip, a system-on-a-chip, an ASIC, or other type of hardware component. In certain embodiments, one or more transmitters 830 and/or one or more receivers 835 may be implemented and/or integrated into a multi-chip module. In some embodiments, other components such as the network interface 840 or other hardware components/circuits may be integrated with any number of transmitters 830 and/or receivers 835 into a single chip. In such embodiment, the transmitters 830 and receivers 835 may be logically configured as a transceiver 825 that uses one more common control signals or as modular transmitters 830 and receivers 835 implemented in the same hardware chip or in a multi-chip module.

Figure 9:
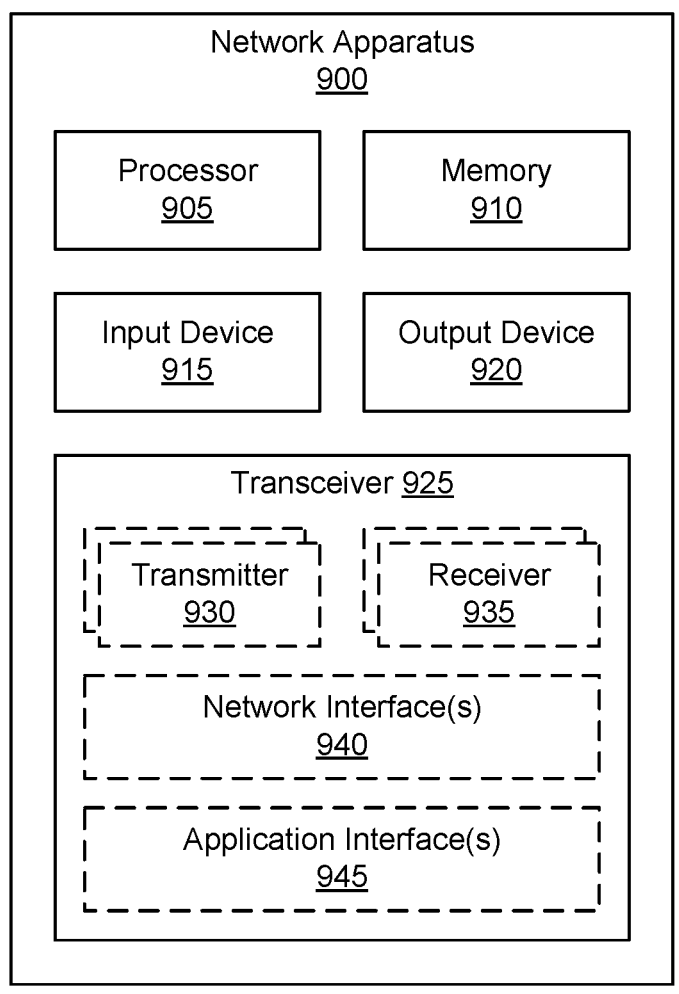
FIG. 9 is a block diagram illustrating one embodiment of a network equipment apparatus that may be used for multiple discrete Fourier transforms for transmission and reception.

FIG. 9 depicts a network apparatus 900 that may be used for multiple discrete Fourier transforms for transmission and reception, according to embodiments of the disclosure. In one embodiment, network apparatus 900 may be one implementation of a RAN node, such as the base unit 121, the RAN node 210, or gNB, described above. Furthermore, the base network apparatus 900 may include a processor 905, a memory 910, an input device 915, an output device 920, and a transceiver 925.

In some embodiments, the input device 915 and the output device 920 are combined into a single device, such as a touchscreen. In certain embodiments, the network apparatus 900 may not include any input device 915 and/or output device 920. In various embodiments, the network apparatus 900 may include one or more of: the processor 905, the memory 910, and the transceiver 925, and may not include the input device 915 and/or the output device 920.

As depicted, the transceiver 925 includes at least one transmitter 930 and at least one receiver 935. Here, the transceiver 925 communicates with one or more remote units 105. Additionally, the transceiver 925 may support at least one network interface 940 and/or application interface 945. The application interface(s) 945 may support one or more APIs. The network interface(s) 940 may support 3GPP reference points, such as Uu, N1, N2 and N3. Other network interfaces 940 may be supported, as understood by one of ordinary skill in the art.

The processor 905, in one embodiment, may include any known controller capable of executing computer-readable instructions and/or capable of performing logical operations. For example, the processor 905 may be a microcontroller, a microprocessor, a CPU, a GPU, an auxiliary processing unit, a FPGA, or similar programmable controller. In some embodiments, the processor 905 executes instructions stored in the memory 910 to perform the methods and routines described herein. The processor 905 is communicatively coupled to the memory 910, the input device 915, the output device 920, and the transceiver 925. In certain embodiments, the processor 905 may include an application processor (also known as "main processor") which manages application-domain and operating system ("OS") functions and a baseband processor (also known as "baseband radio processor") which manages radio function.

In various embodiments, the network apparatus 900 is a RAN node (e.g., gNB) that includes a processor 905 and a transceiver 925. In one embodiment, the transceiver 925 sends, to a user equipment ("UE") device, an indication comprising at least a beta-offset value and multiplexing of a plurality of repetitions of uplink control information ("UCI") on a single transmission occasion of physical uplink shared channel ("PUSCH"). In one embodiment, the transceiver 925 sends, to the UE device, a configuration to determine a starting symbol index and a maximum number of symbols for each of the plurality of repetitions of UCI on PUSCH. In one embodiment, the transceiver 925 receives, from the UE device, UCI on PUSCH that is multiplexed based on the starting symbol index and the maximum number of symbols for each of the plurality of repetitions according to an indicated beta-offset value.

The memory 910, in one embodiment, is a computer readable storage medium. In some embodiments, the memory 910 includes volatile computer storage media. For example, the memory 910 may include a RAM, including dynamic RAM ("DRAM"), synchronous dynamic RAM ("SDRAM"), and/or static RAM ("SRAM"). In some embodiments, the memory 910 includes non-volatile computer storage media. For example, the memory 910 may include a hard disk drive, a flash memory, or any other suitable non-volatile computer storage device. In some embodiments, the memory 910 includes both volatile and non-volatile computer storage media.

In some embodiments, the memory 910 stores data related to multiple discrete Fourier transforms for transmission and reception. For example, the memory 910 may store parameters, configurations, resource assignments, policies, and the like, as described above. In certain embodiments, the memory 910 also stores program code and related data, such as an operating system or other controller algorithms operating on the network apparatus 900.

The input device 915, in one embodiment, may include any known computer input device including a touch panel, a button, a keyboard, a stylus, a microphone, or the like. In some embodiments, the input device 915 may be integrated with the output device 920, for example, as a touchscreen or similar touch-sensitive display. In some embodiments, the input device 915 includes a touchscreen such that text may be input using a virtual keyboard displayed on the touchscreen and/or by handwriting on the touchscreen. In some embodiments, the input device 915 includes two or more different devices, such as a keyboard and a touch panel.

The output device 920, in one embodiment, is designed to output visual, audible, and/or haptic signals. In some embodiments, the output device 920 includes an electronically controllable display or display device capable of outputting visual data to a user. For example, the output device 920 may include, but is not limited to, an LCD display, an LED display, an OLED display, a projector, or similar display device capable of outputting images, text, or the like to a user. As another, non-limiting, example, the output device 920 may include a wearable display separate from, but communicatively coupled to, the rest of the network apparatus 900, such as a smart watch, smart glasses, a heads-up display, or the like. Further, the output device 920 may be a component of a smart phone, a personal digital assistant, a television, a table computer, a notebook (laptop) computer, a personal computer, a vehicle dashboard, or the like.

In certain embodiments, the output device 920 includes one or more speakers for producing sound. For example, the output device 920 may produce an audible alert or notification (e.g., a beep or chime). In some embodiments, the output device 920 includes one or more haptic devices for producing vibrations, motion, or other haptic feedback. In some embodiments, all, or portions of the output device 920 may be integrated with the input device 915. For example, the input device 915 and output device 920 may form a touchscreen or similar touch-sensitive display. In other embodiments, the output device 920 may be located near the input device 915.

The transceiver 925 includes at least transmitter 930 and at least one receiver 935. One or more transmitters 930 may be used to communicate with the UE, as described herein. Similarly, one or more receivers 935 may be used to communicate with network functions in the non-public network ("NPN"), PLMN and/or RAN, as described herein. Although only one transmitter 930 and one receiver 935 are illustrated, the network apparatus 900 may have any suitable number of transmitters 930 and receivers 935. Further, the transmitter(s) 930 and the receiver(s) 935 may be any suitable type of transmitters and receivers.

In one embodiment, the processor 905 determines a first configuration for applying multiple discrete Fourier transform ("DFT")-based waveforms at a transmitter and/or at a receiver. In one embodiment, the processor 905 determines a second configuration for a physical channel, the second configuration comprising a number of DFTs to apply at the transmitter for transforming one or more time-domain signals and/or channels to a frequency domain, a size of each of the DFTs, and a mapping pattern for mapping the output of each of the DFTs onto subcarriers in the frequency domain for a time symbol.

In one embodiment, the processor 905 determines a third configuration for determining an inverse-DFT ("IDFT") configuration comprising a number of IDFTs to apply on the time symbol to receive one or more signals, a size of each of the IDFTs, and a de-mapping pattern from subcarriers to the IDFTs. In one embodiment, the transceiver 925 transmits the determined first, second, and third configurations to a user equipment ("UE") device and transmits a time-domain symbol to the UE where the UE performs multiple IDFT-based receptions of the time-domain symbol based on the IDFT configuration.

FIG. 10 is a flowchart diagram of a method 1000 for multiple discrete Fourier transforms for transmission and reception. The method 1000 may be performed by a UE as described herein, for example, the remote unit 105, the UE and/or the user equipment apparatus 800. In some embodiments, the method 1000 may be performed by a processor executing program code, for example, a microcontroller, a microprocessor, a CPU, a GPU, an auxiliary processing unit, a FPGA, or the like.

In one embodiment, the method 1000 includes receiving 1005 a first configuration from a network to apply multiple discrete Fourier transform ("DFT")-based waveforms at one or more of a transmitter and a receiver. In one embodiment, the method 1000 includes receiving 1010 a second configuration from the network for a physical channel, the second configuration comprising a number of DFTs to apply at the transmitter for transforming one or more time-domain signals and/or channels to a frequency domain, a size of each of the DFTs, and a mapping pattern for mapping the output of each of the DFTs onto subcarriers in the frequency domain for a time symbol.

In one embodiment, the method 1000 includes receiving 1015 a third configuration from the network for determining, based on the second configuration, an inverse-DFT ("IDFT") configuration comprising a number of IDFTs to apply on the time symbol to receive one or more signals, a size of each of the IDFTs, and a de-mapping pattern from subcarriers to the IDFTs. In one embodiment, the method 100 includes performing 1020 multiple DFT-based transmissions on a time-domain symbol transmitted to the network based on the first and second configurations. In one embodiment, the method 1000 includes performing 1025 multiple IDFT-based receptions of a time-domain symbol received from the network, based on the IDFT configuration, and the method 1000 ends.

FIG. 11 is a flowchart diagram of a method 1100 for multiple discrete Fourier transforms for transmission and reception. The method 1100 may be performed by a network entity such as a base node, a gNB, and/or the network equipment apparatus 900. In some embodiments, the method 1100 may be performed by a processor executing program code, for example, a microcontroller, a microprocessor, a CPU, a GPU, an auxiliary processing unit, a FPGA, or the like.

In one embodiment, the method 1100 includes determining 1105 a first configuration for applying multiple discrete Fourier transform ("DFT")-based waveforms at a transmitter and/or at a receiver. In one embodiment, the method 1100 includes determining 1110 a second configuration for a physical channel, the second configuration comprising a number of DFTs to apply at the transmitter for transforming one or more time-domain signals and/or channels to a frequency domain, a size of each of the DFTs, and a mapping pattern for mapping the output of each of the DFTs onto subcarriers in the frequency domain for a time symbol.

In one embodiment, the method 1100 includes determining 1115 a third configuration for determining an inverse-DFT ("IDFT") configuration comprising a number of IDFTs to apply on the time symbol to receive one or more signals, a size of each of the IDFTs, and a de-mapping pattern from subcarriers to the IDFTs. In one embodiment, the method 1100 includes transmitting 1120 the determined first, second, and third configurations to a user equipment ("UE") device. In one embodiment, the method 1100 includes transmitting 1125 a time-domain symbol to the UE where the UE performs multiple IDFT-based receptions of the time-domain symbol based on the IDFT configuration, and the method 1100 ends.

A first apparatus is disclosed for multiple discrete Fourier transforms for transmission and reception. The first apparatus may include a UE as described herein, for example, the remote unit 105, the UE and/or the user equipment apparatus 800. In some embodiments, the first apparatus may include a processor executing program code, for example, a microcontroller, a microprocessor, a CPU, a GPU, an auxiliary processing unit, a FPGA, or the like.

In one embodiment, the first apparatus includes a transceiver that receives a first configuration from a network to apply multiple discrete Fourier transform ("DFT")-based waveforms at one or more of a transmitter and a receiver. In one embodiment, the transceiver receives a second configuration from the network for a physical channel, the second configuration comprising a number of DFTs to apply at the transmitter for transforming one or more time-domain signals and/or channels to a frequency domain, a size of each of the DFTs, and a mapping pattern for mapping the output of each of the DFTs onto subcarriers in the frequency domain for a time symbol.

In one embodiment, the transceiver receives a third configuration from the network for determining, based on the second configuration, an inverse-DFT ("IDFT") configuration comprising a number of IDFTs to apply on the time symbol to receive one or more signals, a size of each of the IDFTs, and a de-mapping pattern from subcarriers to the IDFTs. In one embodiment, the first apparatus includes a processor that performs multiple DFT-based transmissions on a time-domain symbol transmitted to the network based on the first and second configurations and performs multiple IDFT-based receptions of a time-domain symbol received from the network, based on the IDFT configuration.

In one embodiment, the first, the second, and the third configurations each form a portion of a single configuration. In one embodiment, the one or more transformations performed on the physical channel time-domain symbol include at least one transformation selected from the group of: removing a cyclic prefix part of a signal corresponding to a transmitter side, passing the signal from a serial to a parallel converter, performing fast Fourier transform ("FFT") to convert the signal into frequency domain subcarriers, and de-mapping subcarriers.

In one embodiment, the transceiver receives a configuration for at least one control resource set ("CORESET"), the configuration comprising an indication of a number of DFTs used for generating control data and a corresponding demodulation reference signal ("DM-RS"), a length of each of the DFTs to determine a length of the CORESET in the frequency domain, and the mapping pattern for multiplexing the control data and/or the corresponding DM-RS on a time symbol.

In one embodiment, the processor applies a first DFT to the CORESET for transforming time-domain control data to the frequency domain and applies a second DFT to the CORESET for transforming a time-domain DM-RS sequence to the frequency domain, wherein a total length of the CORESET in the frequency domain is equal to the sum length of the output of the first and second DFTs.

In one embodiment, the processor multiplexes output of the first DFT applied to the time-domain control data with output of the second DFT applied to the DM-RS sequence onto the subcarriers in the frequency domain according to the mapping pattern.

In one embodiment, the processor applies one DFT for transforming the time-domain control data to the frequency domain for a CORESET and applies no DFT to the corresponding DM-RS sequence wherein the DM-RS sequence is generated in the frequency domain and the total length of the CORESET in the frequency domain is equal to the sum of the length of the DFT output of the control data and the number of DM-RS frequency domain symbols.

In one embodiment, the processor directly multiplexes the output of the DFT that is applied to the control data with the frequency domain DM-RS sequence onto the subcarriers in the frequency domain according to the mapping pattern.

In one embodiment, the processor, in response to the CORESET duration being more than one symbol, applies different configurations for each of the symbols in terms of the number of DFTs, the length of each of the DFTs, and the mapping of DFT output to subcarriers in the frequency domain.

In one embodiment, the processor configures the CORESET mapping in the frequency domain across different symbols to allow for frequency hopping on the different symbols. In one embodiment, the processor, in response to the CORESET duration being more than one symbol, applies the same configuration for each of the symbols.

In one embodiment, the processor configures multiple CORESETs for a UE with independent configurations in terms of the number of DFTs, the length of each of the DFTs, and the mapping of DFT output to subcarriers in frequency domain.

In one embodiment, the processor configures multiple CORESETs for a UE such that the multiple CORESETs are non-overlapping in the frequency domain. In one embodiment, the processor applies a single DFT for the CORESET in one symbol, and, in response to the CORESET duration being at least two symbols, applies time-domain multiplexing between the control data and the corresponding DM-RS for the CORESET.

In one embodiment, the transceiver transmits a DM-RS symbol prior to the control data symbol for the CORESET. In one embodiment, the transceiver receives a configuration for a CORESET containing at least one selected from the group of: an indication for a number of DFTs used for generating the control data and/or corresponding DM-RS, the length of each of the DFTs to determine the length of the CORESET in the frequency domain, a configuration for a synchronization signal block ("SSB") comprising a number of DFTs used for generating the corresponding signal, the length of each of the DFTs to determine the length of a signal in the frequency domain, and a frequency domain multiplexing pattern to multiplex the output of the DFTs for the CORESET and the output of the DFTs for the SSB.

A first method is disclosed for multiple discrete Fourier transforms for transmission and reception. The first method may be performed by a UE as described herein, for example, the remote unit 105, the UE and/or the user equipment apparatus 800. In some embodiments, the first method may be performed by a processor executing program code, for example, a microcontroller, a microprocessor, a CPU, a GPU, an auxiliary processing unit, a FPGA, or the like.

In one embodiment, the first method includes receiving a first configuration from a network to apply multiple discrete Fourier transform ("DFT")-based waveforms at one or more of a transmitter and a receiver. In one embodiment, the first method includes receiving a second configuration from the network for a physical channel, the second configuration comprising a number of DFTs to apply at the transmitter for transforming one or more time-domain signals and/or channels to a frequency domain, a size of each of the DFTs, and a mapping pattern for mapping the output of each of the DFTs onto subcarriers in the frequency domain for a time symbol.

In one embodiment, the first method includes receiving a third configuration from the network for determining, based on the second configuration, an inverse-DFT ("IDFT") configuration comprising a number of IDFTs to apply on the time symbol to receive one or more signals, a size of each of the IDFTs, and a de-mapping pattern from subcarriers to the IDFTs. In one embodiment, the first method includes performing multiple DFT-based transmissions on a time-domain symbol transmitted to the network based on the first and second configurations and performing multiple IDFT-based receptions of a time-domain symbol received from the network, based on the IDFT configuration.

In one embodiment, the first, the second, and the third configurations each form a portion of a single configuration. In one embodiment, the one or more transformations performed on the physical channel time-domain symbol include at least one transformation selected from the group of: removing a cyclic prefix part of a signal corresponding to a transmitter side, passing the signal from a serial to a parallel converter, performing fast Fourier transform ("FFT") to convert the signal into frequency domain subcarriers, and de-mapping subcarriers.

In one embodiment, the first method includes receiving a configuration for at least one control resource set ("CORESET"), the configuration comprising an indication of a number of DFTs used for generating control data and a corresponding demodulation reference signal ("DM-RS"), a length of each of the DFTs to determine a length of the CORESET in the frequency domain, and the mapping pattern for multiplexing the control data and/or the corresponding DM-RS on a time symbol.

In one embodiment, the first method includes applying a first DFT to the CORESET for transforming time-domain control data to the frequency domain and applies a second DFT to the CORESET for transforming a time-domain DM-RS sequence to the frequency domain, wherein a total length of the CORESET in the frequency domain is equal to the sum length of the output of the first and second DFTs.

In one embodiment, the first method includes multiplexing output of the first DFT applied to the time-domain control data with output of the second DFT applied to the DM-RS sequence onto the subcarriers in the frequency domain according to the mapping pattern.

In one embodiment, the first method includes applying one DFT for transforming the time-domain control data to the frequency domain for a CORESET and applies no DFT to the corresponding DM-RS sequence wherein the DM-RS sequence is generated in the frequency domain and the total length of the CORESET in the frequency domain is equal to the sum of the length of the DFT output of the control data and the number of DM-RS frequency domain symbols.

In one embodiment, the first method includes directly multiplexing the output of the DFT that is applied to the control data with the frequency domain DM-RS sequence onto the subcarriers in the frequency domain according to the mapping pattern.

In one embodiment, the first method includes, in response to the CORESET duration being more than one symbol, applying different configurations for each of the symbols in terms of the number of DFTs, the length of each of the DFTs, and the mapping of DFT output to subcarriers in the frequency domain.

In one embodiment, the first method includes configuring the CORESET mapping in the frequency domain across different symbols to allow for frequency hopping on the different symbols. In one embodiment, the first method includes, in response to the CORESET duration being more than one symbol, applying the same configuration for each of the symbols.

In one embodiment, the first method includes configuring multiple CORESETs for a UE with independent configurations in terms of the number of DFTs, the length of each of the DFTs, and the mapping of DFT output to subcarriers in frequency domain.

In one embodiment, the first method includes configuring multiple CORESETs for a UE such that the multiple CORESETs are non-overlapping in the frequency domain. In one embodiment, the first method includes applying a single DFT for the CORESET in one symbol, and, in response to the CORESET duration being at least two symbols, applies time-domain multiplexing between the control data and the corresponding DM-RS for the CORESET.

In one embodiment, the first method includes transmitting a DM-RS symbol prior to the control data symbol for the CORESET. In one embodiment, the first method includes receiving a configuration for a CORESET containing at least one selected from the group of: an indication for a number of DFTs used for generating the control data and/or corresponding DM-RS, the length of each of the DFTs to determine the length of the CORESET in the frequency domain, a configuration for a synchronization signal block ("SSB") comprising a number of DFTs used for generating the corresponding signal, the length of each of the DFTs to determine the length of a signal in the frequency domain, and a frequency domain multiplexing pattern to multiplex the output of the DFTs for the CORESET and the output of the DFTs for the SSB.

A second apparatus is disclosed for multiple discrete Fourier transforms for transmission and reception. The second apparatus may include a network entity such as a base node, a gNB, and/or the network equipment apparatus 900. In some embodiments, the second apparatus includes a processor executing program code, for example, a microcontroller, a microprocessor, a CPU, a GPU, an auxiliary processing unit, a FPGA, or the like.

The second apparatus, in one embodiment, includes a processor that determines a first configuration for applying multiple discrete Fourier transform ("DFT")-based waveforms at a transmitter and/or at a receiver. In one embodiment, the processor determines a second configuration for a physical channel, the second configuration comprising a number of DFTs to apply at the transmitter for transforming one or more time-domain signals and/or channels to a frequency domain, a size of each of the DFTs, and a mapping pattern for mapping the output of each of the DFTs onto subcarriers in the frequency domain for a time symbol.

In one embodiment, the processor determines a third configuration for determining an inverse-DFT ("IDFT") configuration comprising a number of IDFTs to apply on the time symbol to receive one or more signals, a size of each of the IDFTs, and a de-mapping pattern from subcarriers to the IDFTs. In one embodiment, the second apparatus includes a transceiver that transmits the determined first, second, and third configurations to a user equipment ("UE") device and transmits a time-domain symbol to the UE where the UE performs multiple IDFT-based receptions of the time-domain symbol based on the IDFT configuration.

A second method is disclosed for multiple discrete Fourier transforms for transmission and reception. The second method may be performed by a network entity such as a base node, a gNB, and/or the network equipment apparatus 900. In some embodiments, the second method may be performed by a processor executing program code, for example, a microcontroller, a microprocessor, a CPU, a GPU, an auxiliary processing unit, a FPGA, or the like.

The second method, in one embodiment, includes determining a first configuration for applying multiple discrete Fourier transform ("DFT")-based waveforms at a transmitter and/or at a receiver. In one embodiment, the second method includes determining a second configuration for a physical channel, the second configuration comprising a number of DFTs to apply at the transmitter for transforming one or more time-domain signals and/or channels to a frequency domain, a size of each of the DFTs, and a mapping pattern for mapping the output of each of the DFTs onto subcarriers in the frequency domain for a time symbol.

In one embodiment, the second method includes determining a third configuration for determining an inverse-DFT ("IDFT") configuration comprising a number of IDFTs to apply on the time symbol to receive one or more signals, a size of each of the IDFTs, and a de-mapping pattern from subcarriers to the IDFTs. In one embodiment, the second method includes transmitting the determined first, second, and third configurations to a user equipment ("UE") device and transmitting a time-domain symbol to the UE where the UE performs multiple IDFT-based receptions of the time-domain symbol based on the IDFT configuration.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment ("UE") for wireless communication, comprising:

at least one memory; and at least one processor coupled with the at least one memory and configured to cause the UE to:

receive a first configuration to apply multiple discrete Fourier transform ("DFT")-based waveforms at a transmitter, a receiver, or a combination thereof;

receive a second configuration for a channel, the second configuration comprising a set of DFTs to apply at the transmitter for transforming one or more signals or channels from a time domain to a frequency domain, a size of each DFT of the set of DFTs, and a mapping pattern for mapping an output of each DFT of the set of DFTs onto one or more subcarriers in the frequency domain for a symbol;

receive a third configuration for determining, based on the second configuration, an inverse-DFT ("IDFT") configuration comprising a set of IDFTs to apply on the symbol to receive one or more signals, a size of each IDFT of the set of IDFTs, and a de-mapping pattern for de-mapping an output of each IDFT of the set of IDFTs from one or more subcarriers in the frequency domain to a symbol;

perform multiple DFT-based transmissions on a symbol based on the first and second configurations; and perform multiple IDFT-based receptions of a symbol based on the third configuration.

2. The UE of claim 1, wherein the first, the second, and the third configurations each form a portion of a single configuration.

3. The UE of claim 1, wherein the at least one processor is configured to cause the UE to receive a configuration for at least one control resource set ("CORESET"), the configuration comprising an indication of a set of DFTs used for generating control data and a corresponding demodulation reference signal ("DM-RS"), a length of each of the DFTs to determine a length of the CORESET in the frequency domain, and the mapping pattern for multiplexing the control data and/or the corresponding DM-RS on a time symbol.

4. The UE of claim 3, wherein the at least one processor is configured to cause the UE to:

apply a first DFT to the CORESET for transforming time-domain control data to the frequency domain; and apply a second DFT to the CORESET for transforming a time-domain DM-RS sequence to the frequency domain, wherein a total length of the CORESET in the frequency domain is equal to a sum length of the output of the first and second DFTs.

5. The UE of claim 4, wherein the at least one processor is configured to cause the UE to multiplex output of the first DFT applied to the time-domain control data with output of the second DFT applied to the DM-RS sequence onto the one or more subcarriers in the frequency domain according to the mapping pattern.

6. The UE of claim 4, wherein the at least one processor is configured to cause the UE to:

apply one DFT for transforming the time-domain control data to the frequency domain for a CORESET; and apply no DFT to the corresponding DM-RS sequence, wherein the DM-RS sequence is generated in the frequency domain and the total length of the CORESET in the frequency domain is equal to the sum of the length of the DFT output of the control data and a number of DM-RS frequency domain symbols.

7. The UE of claim 6, wherein the at least one processor is configured to cause the UE to directly multiplex the output of the DFT that is applied to the control data with the DM-RS sequence generated in the frequency domain onto the one or more subcarriers in the frequency domain according to the mapping pattern.

8. The UE of claim 7, wherein the at least one processor is configured to cause the UE to, in response to a duration of the CORESET being more than one symbol:

apply different configurations for each of the symbols in terms of a number of DFTs in the set of DFTs, the length of each of the DFTs, and the mapping of DFT output to the one or more subcarriers in the frequency domain; and configure a mapping of the CORESET in the frequency domain across different symbols to allow for frequency hopping on the different symbols.

9. The UE of claim 8, wherein the at least one processor is configured to cause the UE to configure multiple CORESETs for the UE with independent configurations in terms of a number of DFTs in the set of DFTs, the length of each of the DFTs, and the mapping of DFT output to the one or more subcarriers in frequency domain.

10. The UE of claim 9, wherein the at least one processor is configured to cause the UE to configure multiple CORESETs for the UE such that the multiple CORESETs are non-overlapping in the frequency domain.

11. The UE of claim 10, wherein the at least one processor is configured to cause the UE to:

apply a single DFT for the CORESET in one symbol; and in response to a duration of the CORESET being at least two symbols, apply time-domain multiplexing between the control data and the corresponding DM-RS for the CORESET.

12. The UE of claim 11, wherein the at least one processor is configured to cause the UE to transmit a DM-RS symbol prior to a control data symbol for the CORESET.

13. The UE of claim 1, wherein the at least one processor is configured to cause the UE to receive a configuration for a CORESET comprising an indication of a set of DFTs used for generating control data or corresponding DM-RSs, a length of each of the DFTs to determine a length of the CORESET in the frequency domain, a configuration for a synchronization signal block ("SSB") comprising a set of DFTs used for generating the corresponding signal, the length of each of the DFTs to determine a length of a signal in the frequency domain, a frequency domain multiplexing pattern to multiplex the output of the DFTs for the CORESET and the output of the DFTs for the SSB, or a combination thereof.

14. A method performed by a user equipment ("UE"), comprising:

receiving a first configuration to apply multiple discrete Fourier transform ("DFT")-based waveforms at a transmitter, a receiver, or a combination thereof;

receiving a second configuration for a channel, the second configuration comprising a set of DFTs to apply at the transmitter for transforming one or more signals or channels from a time domain to a frequency domain, a size of each DFT of the set of DFTs, and a mapping pattern for mapping an output of each DFT of the set of DFTs onto one or more subcarriers in the frequency domain for a symbol;

receiving a third configuration for determining, based on the second configuration, an inverse-DFT ("IDFT") configuration comprising a set of IDFTs to apply on the symbol to receive one or more signals, a size of each IDFT of the set of IDFTs, and a de-mapping pattern for de-mapping an output of each IDFT of the set of IDFTs from one or more subcarriers in the frequency domain to a symbol;

performing multiple DFT-based transmissions on a symbol based on the first and second configurations; and performing multiple IDFT-based receptions of a symbol based on the third configuration.

15. A base station for wireless communication, comprising:

at least one memory; and at least one processor coupled with the at least one memory and configured to cause the base station to:

determine a first configuration for applying multiple discrete Fourier transform ("DFT")-based waveforms at a transmitter, a receiver, or some combination thereof;

determine a second configuration for a channel, the second configuration comprising a set of DFTs to apply at the transmitter for transforming one or more signals or channels from a time domain to a frequency domain, a size of each DFT of the set of DFTs, and a mapping pattern for mapping an output of each DFT of the set of DFTs onto one or more subcarriers in the frequency domain for a symbol;

determine a third configuration for determining an inverse-DFT ("IDFT") configuration comprising a set of IDFTs to apply on the symbol to receive one or more signals, a size of each IDFT of the set of IDFTs, and a de-mapping pattern for de-mapping an output of each IDFT of the set of IDFTs from one or more subcarriers in the frequency domain to a symbol;

transmit the determined first, second, and third configurations to a user equipment ("UE") device; and transmit a symbol to the UE for performing multiple IDFT-based receptions of the symbol based on the third configuration.

16. A processor for wireless communication, comprising:

at least one controller coupled with at least one memory and configured to cause the processor to:

receive a first configuration to apply multiple discrete Fourier transform ("DFT")-based waveforms at a transmitter, a receiver, or some combination thereof;

receive a second configuration for a channel, the second configuration comprising a set of DFTs to apply at the transmitter for transforming one or more signals or channels from a time domain to a frequency domain, a size of each DFT of the set of DFTs, and a mapping pattern for mapping an output of each DFT of the set of DFTs onto one or more subcarriers in the frequency domain for a symbol;

receive a third configuration for determining, based on the second configuration, an inverse-DFT ("IDFT") configuration comprising a set of IDFTs to apply on the symbol to receive one or more signals, a size of each IDFT of the set of IDFTs, and a de-mapping pattern for de-mapping an output of each IDFT of the set of IDFTs from one or more subcarriers in the frequency domain to a symbol;

perform multiple DFT-based transmissions on a symbol based on the first and second configurations; and performs multiple IDFT-based receptions of a symbol based on the third configuration.

17. The processor of claim 16, wherein the first, the second, and the third configurations each form a portion of a single configuration.

18. The processor of claim 16, wherein the at least one controller is configured to cause the processor to receive a configuration for at least one control resource set ("CORESET"), the configuration comprising an indication of a set of DFTs used for generating control data and a corresponding demodulation reference signal ("DM-RS"), a length of each of the DFTs to determine a length of the CORESET in the frequency domain, and the mapping pattern for multiplexing the control data and/or the corresponding DM-RS on a time symbol.

19. The processor of claim 18, wherein the at least one controller is configured to cause the processor to:

apply a first DFT to the CORESET for transforming time-domain control data to the frequency domain; and apply a second DFT to the CORESET for transforming a time-domain DM-RS sequence to the frequency domain, wherein a total length of the CORESET in the frequency domain is equal to a sum length of the output of the first and second DFTs.

20. The processor of claim 19, wherein the at least one controller is configured to cause the processor to multiplex output of the first DFT applied to the time-domain control data with output of the second DFT applied to the DM-RS sequence onto the one or more subcarriers in the frequency domain according to the mapping pattern.

* * * * *